(12) United States Patent
Bush et al.

(10) Patent No.: US 10,097,585 B2
(45) Date of Patent: Oct. 9, 2018

(54) MODEL-BASED SECURITY POLICY CONFIGURATION AND ENFORCEMENT IN AN INDUSTRIAL AUTOMATION SYSTEM

(71) Applicant: Rockwell Automation Technologies, Inc., Mayfield Heights, OH (US)

(72) Inventors: Michael A. Bush, Hudson, OH (US); Jack M. Visoky, Willoughby, OH (US); Taryl J. Jasper, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 138 days.

(21) Appl. No.: 15/147,667

(22) Filed: May 5, 2016

(65) Prior Publication Data

US 2017/0214717 A1 Jul. 27, 2017

Related U.S. Application Data

(60) Provisional application No. 62/286,072, filed on Jan. 22, 2016.

(51) Int. Cl.
*G06F 17/00* (2006.01)
*H04L 29/06* (2006.01)
(Continued)

(52) U.S. Cl.
CPC .......... *H04L 63/20* (2013.01); *G05B 19/0426* (2013.01); *G05B 19/4185* (2013.01); *H04L 63/107* (2013.01)

(58) Field of Classification Search
USPC .......................................... 726/1, 2; 707/10
See application file for complete search history.

(56) References Cited

U.S. PATENT DOCUMENTS

2012/0089240 A1* 4/2012 Chand ..................... H04L 63/10
700/79

FOREIGN PATENT DOCUMENTS

| EP | 1645926 | 4/2006 | |
|---|---|---|---|
| EP | 2775685 | 9/2014 | |
| EP | 2775685 A1 * | 9/2014 | ........... H04L 63/105 |

OTHER PUBLICATIONS

Extended European Search Report for EP Patent Application Serial No. 17151596.8-1802 dated May 16, 2017, 9 pages.

(Continued)

*Primary Examiner* — Jeffrey C Pwu
*Assistant Examiner* — Samuel Ambaye
(74) *Attorney, Agent, or Firm* — Amin, Turocy & Watson, LLP

(57) ABSTRACT

A model-based industrial security policy configuration system implements a plant-wide industrial asset security policy in accordance with security policy definitions provided by a user. The configuration system models the collection of industrial assets for which diverse security policies are to be implemented. An interface allows the user to define security policies for a plant environment at a high-level by grouping the industrial assets into security zones, and defining any additional communication permissions in terms of asset-to-asset, asset-to-zone, or zone-to-zone conduits. Based on the model and these policy definitions, the system generates asset-level security setting instructions configured to set appropriate security settings on one or more of the industrial assets, and deploys these instructions to the appropriate assets in order to implement the defined security policy.

20 Claims, 25 Drawing Sheets

(51) Int. Cl.
*G05B 19/042* (2006.01)
*G05B 19/418* (2006.01)

(56) References Cited

OTHER PUBLICATIONS

Luciana Obregon; Secure Architecture for Industrial Control Systems; SANS Institute InfoSec Reading Room; Template Version Sep. 2014, Accepted Sep. 23, 2015; 28 pages.

* cited by examiner

Two Zones, Asset to Asset (Legacy Device)

D1 can communicate with no security to D4 (asset-to-asset)

Zone Settings

| Zone | User Cert | PSK | Whitelist | Notes | I/O | Messaging | Messaging Confidentiality |
|------|-----------|-----|-----------|-------|-----|-----------|---------------------------|
| Z1 | | X | | Machine 1 | Not Secure | Secure | No |
| Z2 | | | | Machine 2 | | | |

Zone to Asset Assignments

| Asset Name | Asset Catalog Number | Asset Zone | Asset IP Address | CIP Security Capable | Conduit | End Point | End Point |
|------------|----------------------|------------|------------------|----------------------|---------|-----------|-----------|
| D1 | 1756-EN5T | Z1 | 192.168.1.1 | Yes | #1-Whitelist | Asset - D1 | Asset - D4 |
| D2 | Workstation | Z1 | 192.168.1.2 | Yes | | | |
| D3 | 1756-EN2T | Z1 | 192.168.1.3 | Yes | | | |
| D4 | Adapter | Z2 | 192.168.1.4 | No | | | |

FIG. 8A

Line Supervisor - mix of legacy and secure devices (1 : many)
D1 - D8 and D5 - D8 (no security) and D1-D5 (secure) (asset-to-asset)

| Zone | User Cert |
|---|---|
| Z1 | X |
| Z2 | X |
| Z3 | |

| Asset Name | Asset Catalog Number | PSK | Whitelist | Asset Zone | Asset IP Address | CIP Security Capable | Notes | I/O | Messaging Secure | Messaging Confidentiality |
|---|---|---|---|---|---|---|---|---|---|---|
| | | | | | | | Machine 1 | Not Secure | Secure | No |
| | | | | | | | Machine 2 | Not Secure | Secure | No |
| | | | | | | | Supervisory | | | |
| D1 | 1756-EN2T | | | Z1 | 192.168.1.11 | Yes | | | | |
| D2 | 1756-EN5T | | | Z1 | 192.168.1.12 | Yes | | | | |
| D3 | Legacy HMI | | | Z1 | 192.168.1.13 | Yes | | | | |
| D4 | Workstation | | | Z2 | 192.168.1.14 | Yes | | | | |
| D5 | 1756-EN5T | | | Z2 | 192.168.1.15 | Yes | | | | |
| D6 | 1756-EN5T | | | Z2 | 192.168.1.16 | Yes | | | | |
| D7 | 1756-EN5T | | | Z3 | 192.168.1.17 | No | | | | |
| D8 | 1756-EN5T | | | Z3 | 192.168.1.18 | No | | | | |

| Conduit | End Point | End Point |
|---|---|---|
| #1 - Whitelist | Asset - D1 | Asset - D8 |
| #2 - Whitelist | Asset - D5 | Asset - D8 |
| #3 - User Cert | Asset - D1 | Asset - D5 |

FIG. 9A

Line Supervisor: multi trust zones (3 secure zones)
Zone 3 can communicate with Zone 1 and with Zone 2 securely (zone-to-zone)

| Zone | User Cert | PSK | | Whitelist | Notes | I/O | Messaging | Messaging Confidentiality |
|---|---|---|---|---|---|---|---|---|
| Z1 | x | | | | Machine 1 | Not Secure | Secure | No |
| Z2 | x | | | | Machine 2 | Not Secure | Secure | No |
| Z3 | x | | | | Supervisory | Not Secure | Secure | No |

| Asset Name | Asset Catalog Number | Asset Zone | Asset IP Address | CIP Security Capable | | Conduit | End Point | End Point |
|---|---|---|---|---|---|---|---|---|
| D1 | L8z | Z1 | 192.168.1.1 | Yes | | #1 - Use Cert | Zone - Z1 | Zone - Z3 |
| D2 | 1756-EN4T | Z1 | 192.168.1.2 | Yes | | #2 - Use Cert | Zone - Z2 | Zone - Z3 |
| D3 | Neo | Z1 | 192.168.1.3 | Yes | | | | |
| D4 | L8z | Z2 | 192.168.1.4 | Yes | | | | |
| D5 | Large Neo | Z2 | 192.168.1.5 | Yes | | | | |
| D6 | 1756-EN4T | Z2 | 192.168.1.6 | Yes | | | | |
| D7 | ViewSE | Z3 | 192.168.1.7 | Yes | | | | |
| D8 | Workstation | Z3 | 192.168.1.8 | Yes | | | | |

FIG. 10A

Line Supervisor, multi trust zones (legacy and secure zones)
Zone 3 can communicate with Zone 1 and with Zone 2 w/no security (zone-to-zone)

| Zone | User Cert | PSK | Whitelist | Notes | I/O | Messaging | Messaging Confidentiality |
|---|---|---|---|---|---|---|---|
| Z1 | X | | | Machine 1 | Not Secure | Secure | No |
| Z2 | X | | | Machine 2 | Not Secure | Secure | No |
| Z3 | | | | Supervisory | | | |

| Asset Name | Asset Catalog Number | Asset Zone | Asset IP Address | CIP Security Capable | | Conduit | End Point | End Point |
|---|---|---|---|---|---|---|---|---|
| D1 | L8z | Z1 | 192.168.1.1 | Yes | | #1 - Whitelist | Zone - Z1 | Zone - Z3 |
| D2 | 1756-EN4T | Z1 | 192.168.1.2 | Yes | | #2 - Whitelist | Zone - Z2 | Zone - Z3 |
| D3 | Neo | Z1 | 192.168.1.3 | Yes | | | | |
| D4 | L8z | Z2 | 192.168.1.4 | Yes | | | | |
| D5 | Large Neo | Z2 | 192.168.1.5 | Yes | | | | |
| D6 | 1756-EN4T | Z2 | 192.168.1.6 | Yes | | | | |
| D7 | ViewSE | Z3 | 192.168.1.7 | No | | | | |
| D8 | Workstation | Z3 | 192.168.1.8 | No | | | | |

FIG. 11A

Line Supervisor, multi trust zones (legacy and secure zone - vendor cert)
Zone 1 can communicate with Zone 2 who security (zone-to-zone)

| Zone | Vendor Cert | PSK | Whitelist | Notes | I/O | Messaging | Messaging Confidentiality |
|---|---|---|---|---|---|---|---|
| Z1 | X | | | Machine 1 | Not Secure | Secure | No |
| Z2 | | | | Machine 2 | | | |

| Asset Name | Asset Catalog Number | Asset Zone | Asset IP Address | OP Security Capable | Conduit | End Point | End Point |
|---|---|---|---|---|---|---|---|
| D1 | L8z | Z1 | 192.168.1.1 | Yes | #1 - Whitelist | Zone - Z1 | Zone - Z2 |
| D2 | 1756-EN4T | Z1 | 192.168.1.2 | Yes | | | |
| D3 | Neo | Z1 | 192.168.1.3 | Yes | | | |
| D4 | L8z | Z1 | 192.168.1.4 | Yes | | | |
| D5 | Large Neo | Z1 | 192.168.1.5 | Yes | | | |
| D6 | 1756-EN4T | Z1 | 192.168.1.6 | Yes | | | |
| D7 | ViewSE | Z2 | 192.168.1.7 | No | | | |
| D8 | Workstation | Z2 | 192.168.1.8 | No | | | |

FIG. 12A

| Zone | User Cert | PSK | Whitelist | Notes | I/O | Messaging | Messaging Confidentiality |
|---|---|---|---|---|---|---|---|
| Z1 | X | | | Machine 1 | Not Secure | Secure | No |
| Z2 | X | | | Machine 2 | Not Secure | Secure | No |
| Z3 | X | | | Supervisory | Not Secure | Secure | No |

Line Supervisor, zone to device trust (with CIP Security)
D2 and D6 can communicate with Z3 (asset-to-zone)

| Asset Name | Asset Catalog Number | Asset Zone | Asset IP Address | CIP Security Capable | Conduit | End Point | End Point |
|---|---|---|---|---|---|---|---|
| D1 | 1756-ENBT | Z1 | 192.168.1.1 | Yes | | | |
| D2 | 1756-ENBT | Z1 | 192.168.1.2 | Yes | #1 - Use Cert | Asset - D2 | Zone - Z3 |
| D3 | 1756-ENBT | Z1 | 192.168.1.3 | Yes | #2 - Use Cert | Asset - D6 | Zone - Z3 |
| D4 | Workstation | Z3 | 192.168.1.4 | Yes | | | |
| D5 | HMI | Z3 | 192.168.1.5 | Yes | | | |
| D6 | 1756-ENBT | Z2 | 192.168.1.7 | Yes | | | |

FIG. 13A

MODEL-BASED SECURITY POLICY CONFIGURATION AND ENFORCEMENT IN AN INDUSTRIAL AUTOMATION SYSTEM

CROSS-REFERENCE TO RELATED APPLICATIONS

This application claims priority to U.S. Provisional Application Ser. No. 62/286,072, filed on Jan. 22, 2016, and entitled "MODEL-BASED SECURITY POLICY CONFIGURATION AND ENFORCEMENT IN AN INDUSTRIAL AUTOMATION SYSTEM," the entirety of which is incorporated herein by reference.

BACKGROUND

The subject matter disclosed herein relates generally to industrial automation systems, and, more particularly, to implementation of security policies in an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for configuring security in an industrial environment is provided, comprising an interface component configured to receive zone configuration input that assigns respective industrial assets to selected security zones; an instruction translation component configured to generate one or more security configuration instructions directed to one or more of the industrial assets based on the zone configuration input, wherein the one or more security configuration instructions are configured to set respective asset-level security settings on the one or more of the industrial assets; and a communication component configured to send the one or more security configuration instructions to the one or more of the industrial assets.

Also, according to one or more embodiments, a method for configuring industrial network security is provided, comprising receiving, by a system comprising at least one processor, zone configuration input data that defines groups of industrial devices and associates the groups to respective security zones; generating, by the system, one or more security configuration instructions based on the zone configuration input, wherein the one or more security configuration instructions are configured to set respective device-level security settings on one or more of the industrial devices; and sending, by the system, the one or more security instructions to the one or more of the industrial devices.

Also, a non-transitory computer-readable medium is provided having stored thereon executable instructions that, in response to execution, cause a computer system comprising at least one processor to perform operations, the operations comprising receiving, zone configuration data that assigns respective industrial assets to selected security zones; generating one or more security configuration instructions based on the zone configuration data, wherein the one or more security configuration instructions are configured to set respective asset-level security settings on one or more of the industrial assets; and sending the one or more security instructions to the one or more of the industrial assets.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8A is a table illustrating example configuration input that can be provided to a security configuration system by a user in order to implement a security policy.

FIG. 9A is a table illustrating example configuration input that can be provided to a security configuration system by a user in order to implement a security policy.

FIG. 10A is a table illustrating example configuration input that can be provided to a security configuration system by a user in order to implement a security policy.

FIG. 11A is a table illustrating example configuration input that can be provided to a security configuration system by a user in order to implement a security policy.

FIG. 12A is a table illustrating example configuration input that can be provided to a security configuration system by a user in order to implement a security policy.

FIG. 13A is a table illustrating example configuration input that can be provided to a security configuration system by a user in order to implement a security policy.

DETAILED DESCRIPTION

Figure 1:
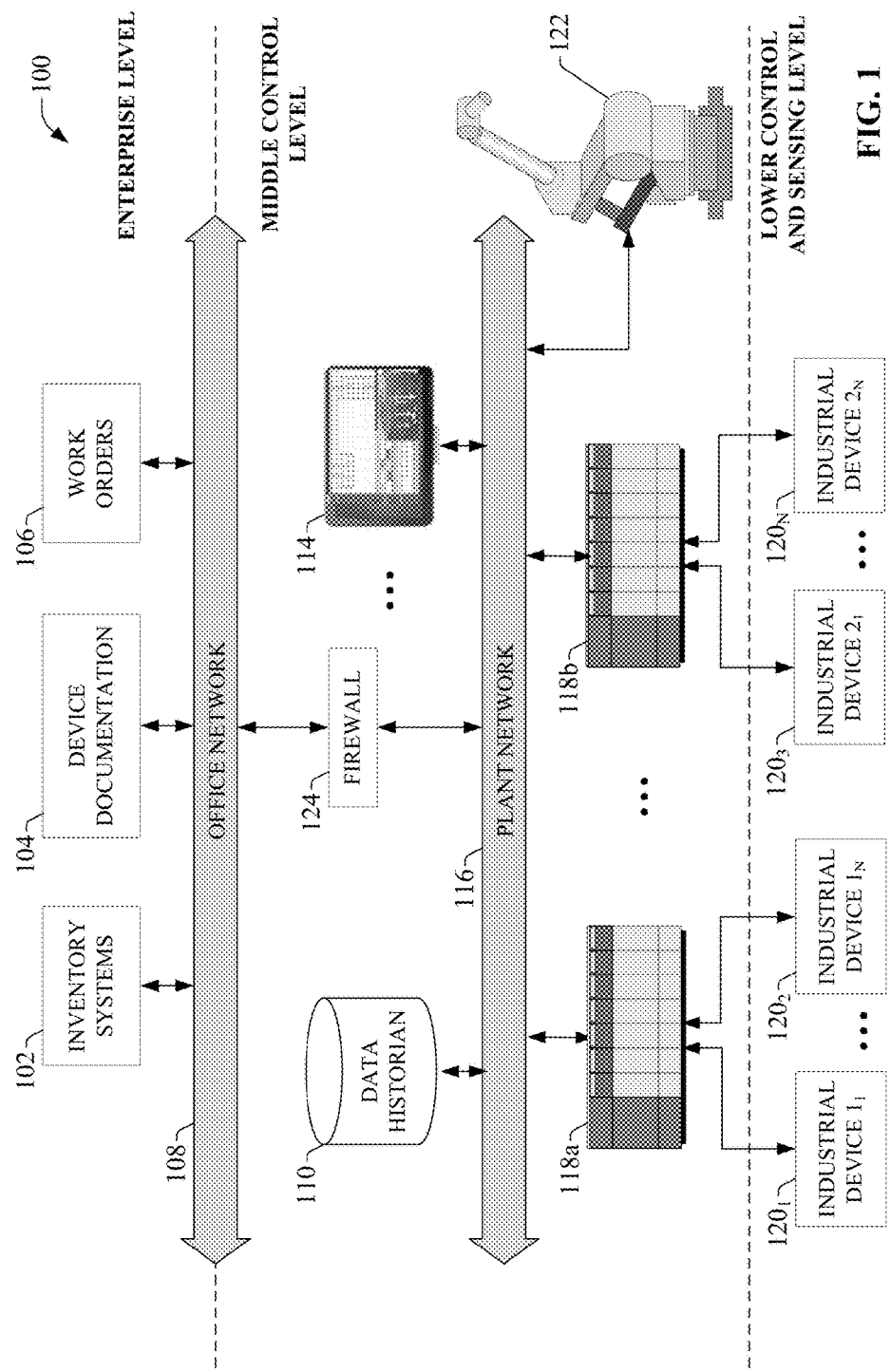
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100, including a number of diverse industrial devices and assets. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial devices or assets can include industrial robots 122, which may operate in accordance with programs executed by their own internal controllers, in conjunction with information exchanged with one or more external controllers (e.g., PLCs 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include one or more data historians 110 that aggregate and store production information collected from the industrial controllers 118 or other data sources, or a device documentation store 104 containing electronic documentation for the various industrial devices making up the controlled industrial systems. Other industrial devices or assets may include inventory tracking systems 102, work order management systems 106, or other such systems, some or all of which may reside on an office network 108 of the industrial environment (e.g., a separately managed network relative to plant network 116). The industrial network environment may also include a number of network architecture devices—such as firewall 124, hubs, routers, or switches—that connect separate networks and/or networked devices and manage data flow between the various devices and networks.

Since so many industrial devices, systems, and assets reside on plant and/or office networks, system designers must often configure network security features that prevent unauthorized access to the industrial assets by unauthorized users or devices. Such security measures are required to prevent unauthorized viewing of production data or other sensitive information, or to prevent remote entities from assuming control of the industrial assets and modifying control sequences or device parameters. Configuring security for industrial assets may include, for example, defining access permissions for respective industrial assets (e.g., specifying which other devices or personnel may access a given industrial asset), configuring digital certificates or key-based security for secure data exchange between devices, assigning Internet Protocol (IP) addresses to respective devices, defining network workgroups, configuring firewall parameters to filter access to devices and systems on a plant or office network, configuring whitelists explicitly defining which devices are permitted to exchange data with a given asset, or other such configuration actions.

Typically, setting up security for an industrial automation environment requires a user to configure security parameters and definitions for a large number of separate devices individually. This can be a time-consuming process in an industrial environment comprising a large number of industrial assets and network infrastructure devices. Moreover, configuring these industrial assets for security often requires specialized knowledge of the individual devices being configured, thereby limiting the number of personnel qualified to configure and manage security settings for an industrial environment. Security configuration is rendered more difficult when the industrial environment comprises devices manufactured by a number of different device vendors, since the tools and procedures for configuring security settings and parameters for industrial devices can vary considerably across different product vendors. As such, a person responsible for configuring device security in an industrial environment may require understanding of a wide range of vendor-specific security configuration tools and parameter settings. Also, since security parameters and policies for the respective devices must be configured manually for each device individually, the process of defining security policies is prone to human error. Such errors may result in blocked communications between devices that require a reliable channel for data exchange. Finding and correcting these configuration errors can be a time-consuming and complicated process, and is often cited as a reason why owners of industrial assets opt to leave device security features disabled, putting the industrial devices and processes at risk.

To address these and other issues, one or more embodiments of the present disclosure relate to a model-based security policy configuration system for industrial automation devices and assets. In one or more embodiments, the configuration system can maintain a model of an industrial environment that inventories industrial devices and network infrastructure devices distributed throughout a plant environment, as well as networked interconnections and relationships between the various devices. A user interface associated with the configuration system allows a user to group sets of devices that share a common security context into security zones using an integrated modeling tool. Each security zone comprises devices that are to communicate with one another in a secure manner as part of normal operation of an automation system, and which share common security requirements. Devices outside a given security zone are to be prevented from communicating with devices within the zone. If communication to devices outside the zone are required, the system allows the user to define a conduit between a device within the zone and a device outside the zone, between devices within the zone and another zone, or between the zone and another zone, depending on communication requirements.

Once all necessary devices of an automation system or plant environment have been added to respective security zones and any desired conduits are defined, the configuration system can implement a system-wide security policy based on the zone and conduit information defined by the user, as well as the system model. The configuration system translates the defined security policy into device-level security configuration instructions that are then downloaded or otherwise sent to the appropriate devices (e.g., network infrastructure devices and/or industrial devices) in order to implement the defined security policy. This translation can be based on defined translation rules maintained by the configuration system. These translation rules can include vendor-specific rules capable of generating appropriate security configuration instructions for respective vendor-specific devices. In this way, the system hides or abstracts from the user the technical complexities associated with setting device-level security parameters. The configuration system also abstracts the cross-vendor or cross-product differences in technology required to enforce the security policy.

Figure 2:
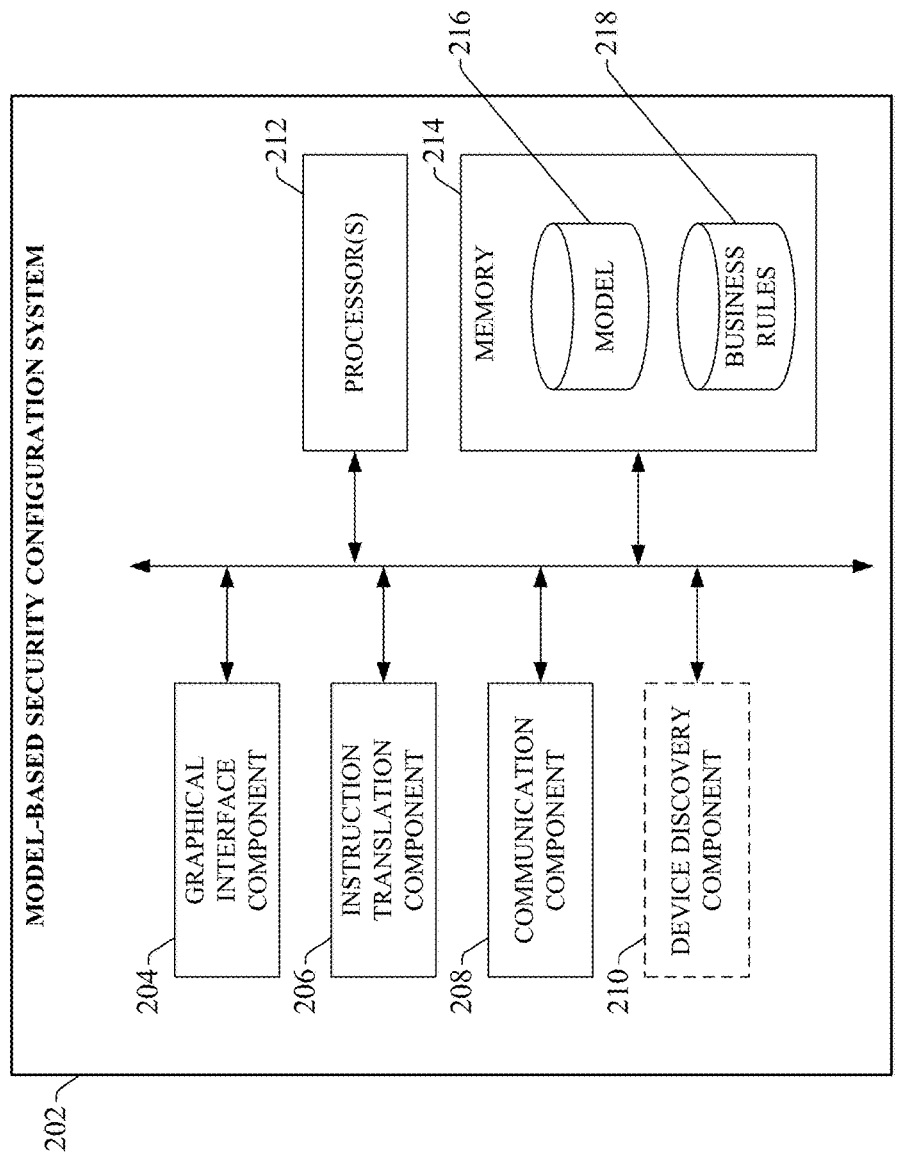
FIG. 2 is a block diagram of an example model-based security configuration system.

FIG. 2 is a block diagram of an example model-based security configuration system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Model-based security configuration system 302 can include a graphical interface component 204, an instruction translation component 206, a communication component 208, a device discovery component 210, one or more processors 212, and memory 214. In various embodiments, one or more of the graphical interface component 204, instruction translation component 206, communication component 208, device discovery component 210, the one or more processors 212, and memory 214 can be electrically and/or communicatively coupled to one another to perform one or more of the functions of the model-based security configuration system 202. In some embodiments, components 204, 206, 208, and 210 can comprise software instructions stored on memory 214 and executed by processor(s) 212. Model-based security configuration system 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Graphical interface component 204 can be configured to generate a set of graphical user interface displays with which a user can interact in order to define security zones, assign industrial and networking devices to defined zones, define conduits between devices and/or zones, download or distribute security configuration instructions to appropriate devices that make up an industrial automation environment, and other such functions. Example displays will be described in more detail below.

Instruction translation component 206 can be configured to read device, zone, and conduit information provided by the user (or automatically detected by the configuration system 202) and generate a set of security configuration instructions that, when implemented on respective industrial and/or networking devices, enforce the plant-wide security strategy defined by the user-provided device, zone, and conduit information. The instruction translation component 206 can generate these instructions based on a stored model 216 that describes the inventory of industrial and networking devices that make up the user's plant environment, as well as the networked connectivity between the devices. This model 216 includes vendor and model information for the various devices, allowing instruction translation component 206 to generate appropriate vendor- and model-specific security configuration instructions that will implement the user's desired security policies. Instruction translation component 206 can also generate these instructions based on defined business rules 218 that determine how security configuration conflicts are to be resolved for a given scenario.

Communication component 208 can be configured to exchange data between the model-based security configuration system 202 and devices on a plant and/or office network. This can include, for example, sending security configuration instructions to the devices, polling for device identification and configuration information, etc. Device discovery component 210 is an optional component that can be included in some embodiments, and can be configured to discover and identify devices on the plant network for which security is to be configured. This can include identifying model information, vendor information, firmware revision information, network identifiers, or other such information.

The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
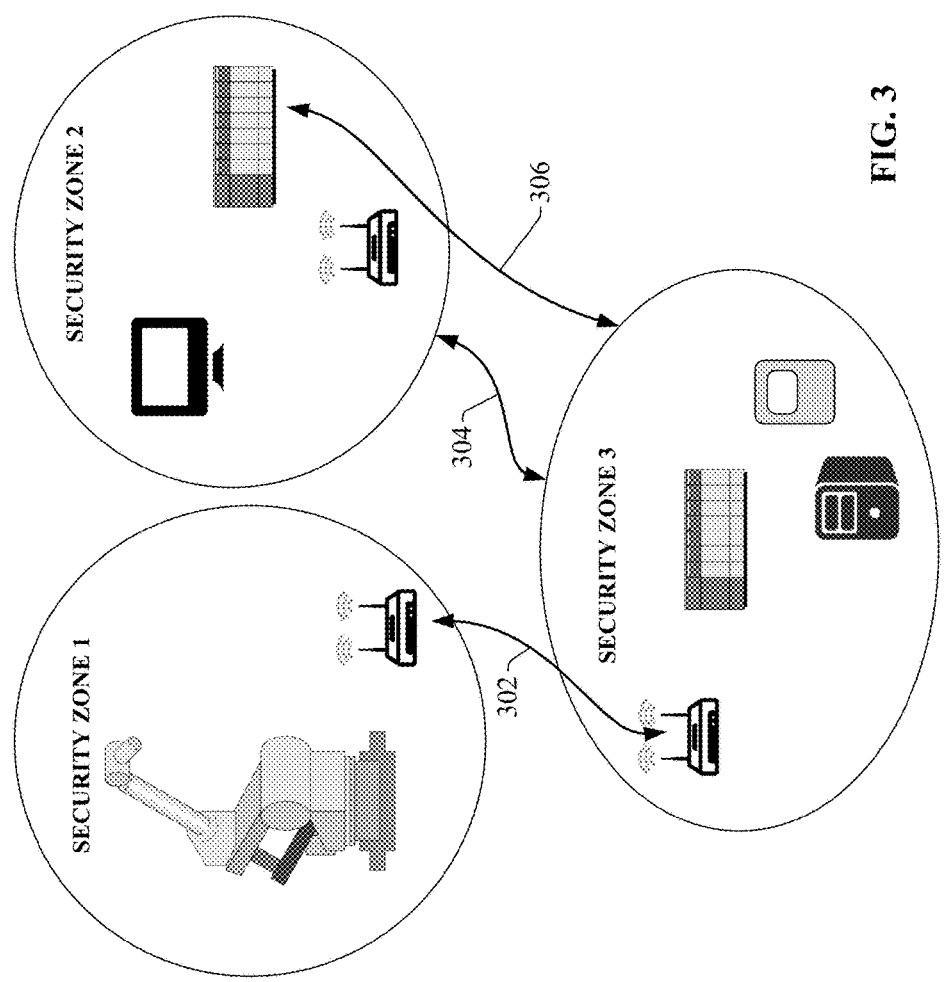
FIG. 3 is a diagram illustrating assignment of industrial devices to various security zones.

The model-based security configuration system described herein allows a user to easily create a security model for their collection of networked industrial assets, which is then used by the system to generate device-specific security configuration instructions and set device security parameters for individual devices on the network. The security model can be based on IEC 62443 standards, which recommend defining zones of trust within a given plant environment, such that devices that are to be allowed to communicate securely and which share common security requirements are assigned to a common zone. FIG. 3 is a diagram illustrating assignment of industrial devices to various security zones. In this example, a number of industrial devices have been grouped into three security zones. In general, each zone is a grouping of logical or physical assets that share common security requirements. Devices within a common security zone are to be allowed to exchange data with one another via secure communication channels, but are not permitted to communicate with devices that are not assigned to that zone unless a channel or conduit is defined. A channel is a specific logical or physical communication link between assets in two separate zones. A conduit (represented by lines 302 and 304) is a logical group of communication channels between two or more devices and/or zones that share common security requirements. For conduits, a boundary device can be defined as a communication security asset (e.g., a network infrastructure device) that provides an interface between a zone and a conduit. As will be describe in more detail below, modeling tools provided by the security configuration system described herein can allow communication links to be defined between two specified devices (as represented by line 302), between a specified device and a zone of devices (as represented by line 306), or between two zones (as represented by line 304).

The modeling tools provided by the security configuration system 202 can allow a user to group their existing assets into security zones, define conduits between zones and/or devices, and define security requirements for the respective zones and conduits. The zones and conduits define trust relationships between devices and/or zones of devices, and may include nested or foreign zones. Channels define trusted communication links between devices. As will be described in more detail below, the security configuration system 202 described herein provides an intuitive interface with which the user can define these various trust relationships between their various industrial assets, and generates a suitable set of security configuration instructions for deployment to the user's industrial assets based on these defined trust relationships, thereby abstracting and simplifying the process of configuring the security parameters for each individual device.

Figure 4:
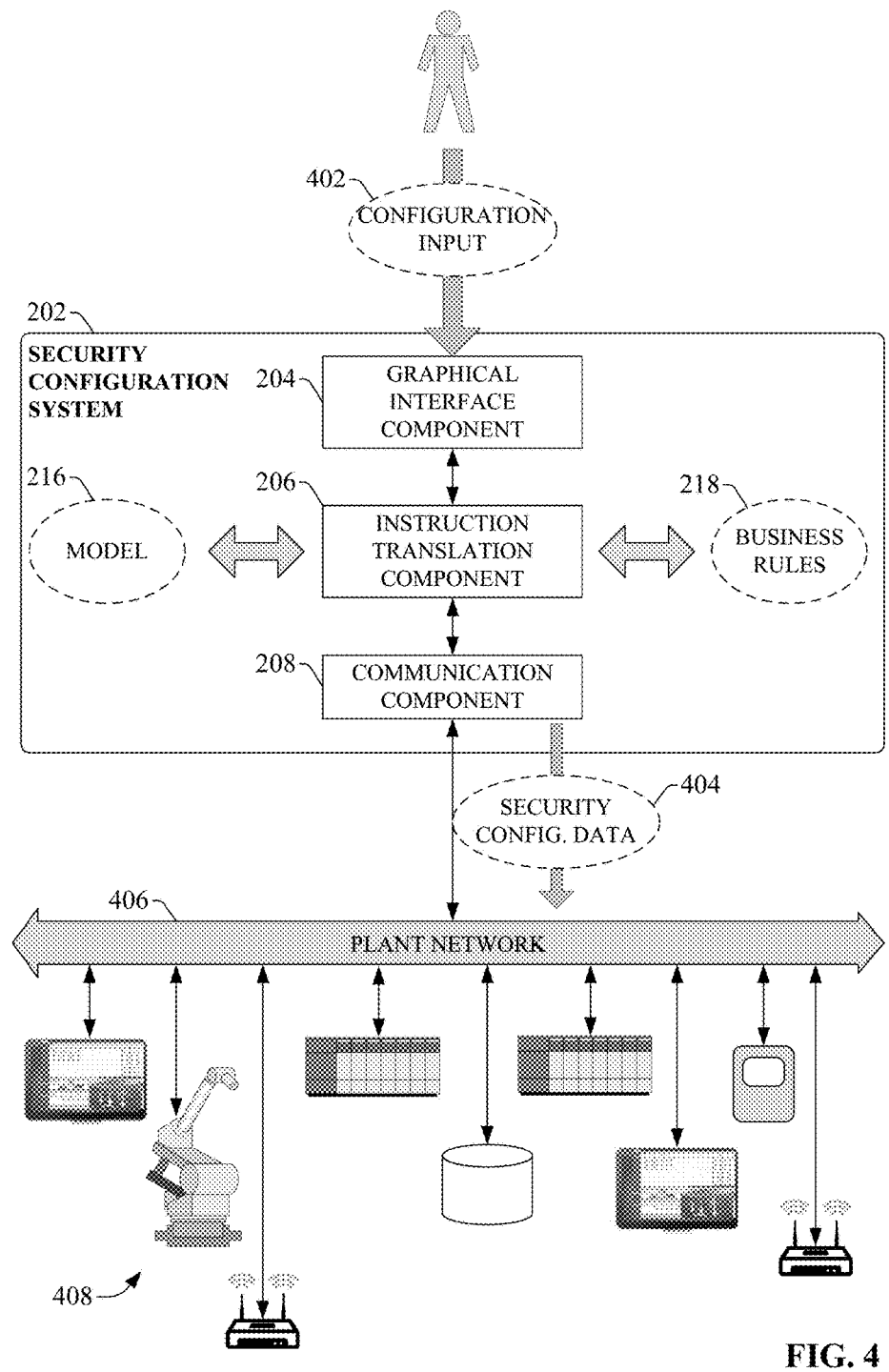
FIG. 4 is a diagram of an example system architecture that includes security configuration system for configuration of plant-wide device security policies.

FIG. 4 is a diagram of an example system architecture that includes security configuration system 202 for configuration of plant-wide device security policies. In the illustrated example, a plant environment comprises a number of industrial devices and assets 408, which reside on a plant network 406. Plant network 406 may conform to any suitable networking protocol or combination of protocols, including but not limited to Ethernet, Ethernet/IP, DeviceNet, ControlNet, Data Highway and Data Highway Plus (DH/DH+), Remote I/O, Fieldbus, Modbus, Profibus, wireless networks, serial protocols, etc. The industrial assets 408 may comprise, for example, PLCs, motor drives (e.g., variable frequency drives), vision systems, safety relays, human-machine interface terminals, industrial robot controllers, data historians, work order tracking systems, or other such industrial assets. Industrial assets 408 can also include the network infrastructure devices (e.g., routers, hubs, switches, firewalls, etc.) that make up the backbone of the plant network 116 and which manage data transfer and security between network devices and network segments.

Security configuration using the security configuration system 202 is driven in part by model 216, which models the collection of industrial assets 408 and the networked connectivity between the devices. Model 216 can be generated using one or both of manual configuration or automatic device detection. To allow devices to be added to model 216, some embodiments of security configuration system 202 can maintain a database of industrial device definitions that can be manually or automatically selected and added to the model as needed. For manual configuration, the graphical interface component 204 may generate and display one or more device selection screens that allow the user to browse a stored database of devices according to one or more of device vendor, device model, device type, firmware revision, or other device identification information. For embodiments that include a device discovery component 210, the configuration system 202 can poll plant network 406 for industrial devices present on the network. In such embodiments, the device discovery component 210 can access device identification information present on a networked device (if the device supports auto-discovery) and update the model 216 to include the discovered device. In some embodiments, the device discovery component 210 can also retrieve any current device configuration information on the device (e.g., network address, pre-existing security parameters, etc.) that may be required by the system in order to generate security configuration instructions for the device or for other devices that will be communicating with the device.

Figure 5:
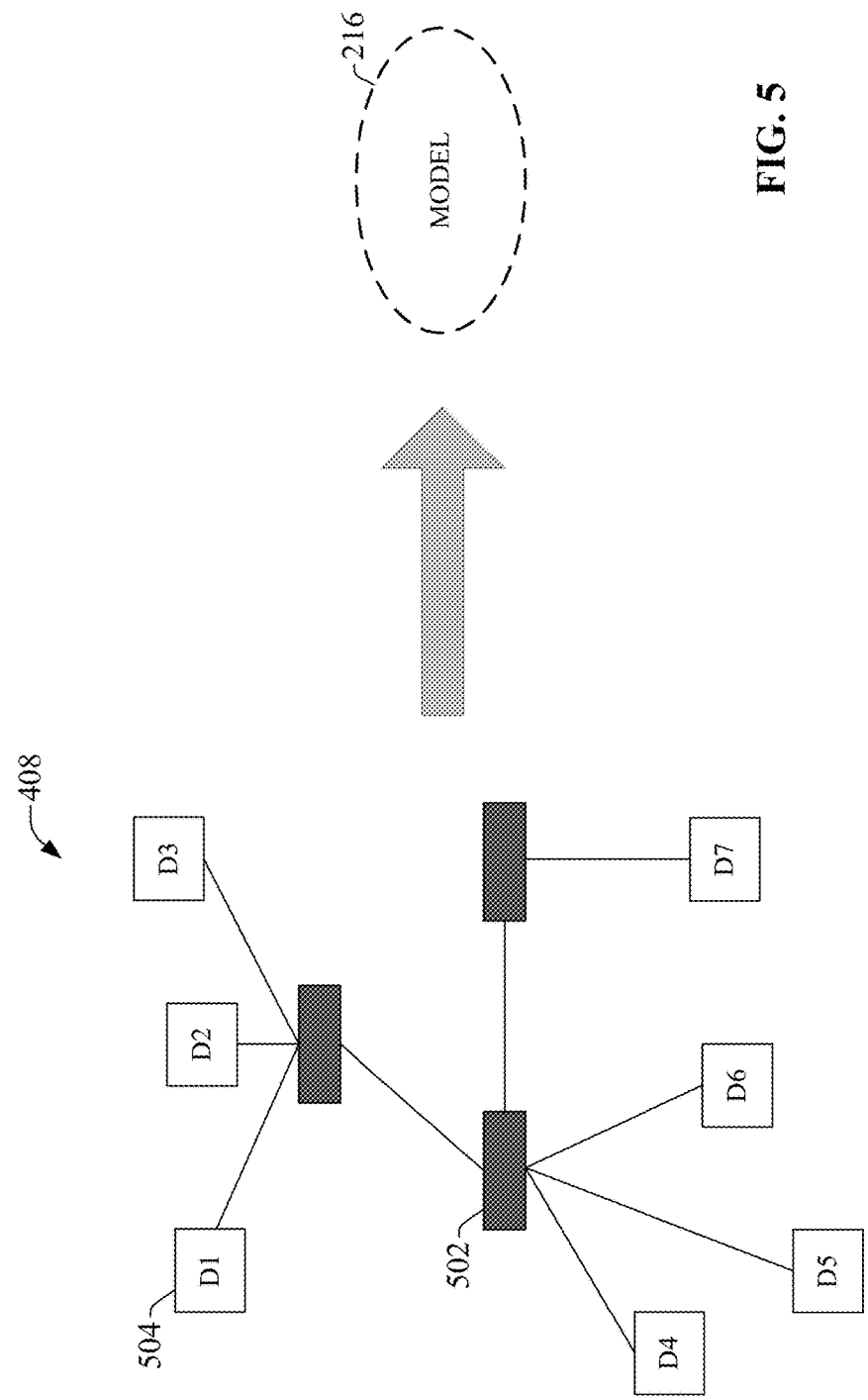
FIG. 5 is a diagram illustrating modeling of a network of industrial assets by a model-based security policy configuration system.

Turning briefly to FIG. 5, the collection of industrial assets 408 can be viewed as a network of industrial devices 504 (e.g., devices D1, D2, etc.) and network infrastructure devices 502 that serve as the network backbone to facilitate communication between the devices. Model 216 represents this configuration of devices, and comprises a set of information identifying the industrial devices and network infrastructure devices that make up the collected set of industrial assets 408. An example model 216 may define each device in terms of the device vendor and model, the device's current software or firmware revisions, current network settings (e.g., network addresses), current security settings, and other relevant information.

Returning to FIG. 4, once the model 216 is configured to reflect the collection of industrial assets, the graphical interface component 204 can generate one or more trust definition screens that allow the user to further refine the model by defining a plant-wide security strategy for the device. In particular, the trust definitions screens provide an intuitive interface that allows the user to group the devices and assets into security zones, and define any desired channels and/or conduits between devices and zones, thereby defining high-level security policies for the collection of industrial assets 408. The graphical interface component 204 can render these security policy definition displays in any format suitable for receiving the user-defined security definition information. For example, in some embodiments the system may render an interactive table that allows the user to define one or more security zones and to associate selected devices from the set of industrial assets 408 to respective zones. This interactive table can also allow the user to define one or more conduits between devices and/or zones by selecting the two endpoint devices or zones for the conduit. Example configuration tables will be described in more detail below.

In other embodiments, the graphical interface component 204 may render a graphical interface that allows the user to define the security policies by manipulating icons representing the industrial assets deployed on the plant floor. For example, in such embodiments the user may group devices into security zones by creating circles representing the zones, and dragging the device icons into the desired zones. To create channels and conduits, the graphical interface can allow the user to add arrows to the configuration view, and to assign the endpoints of the arrows to the appropriate devices or zone boundaries.

Figure 6A:
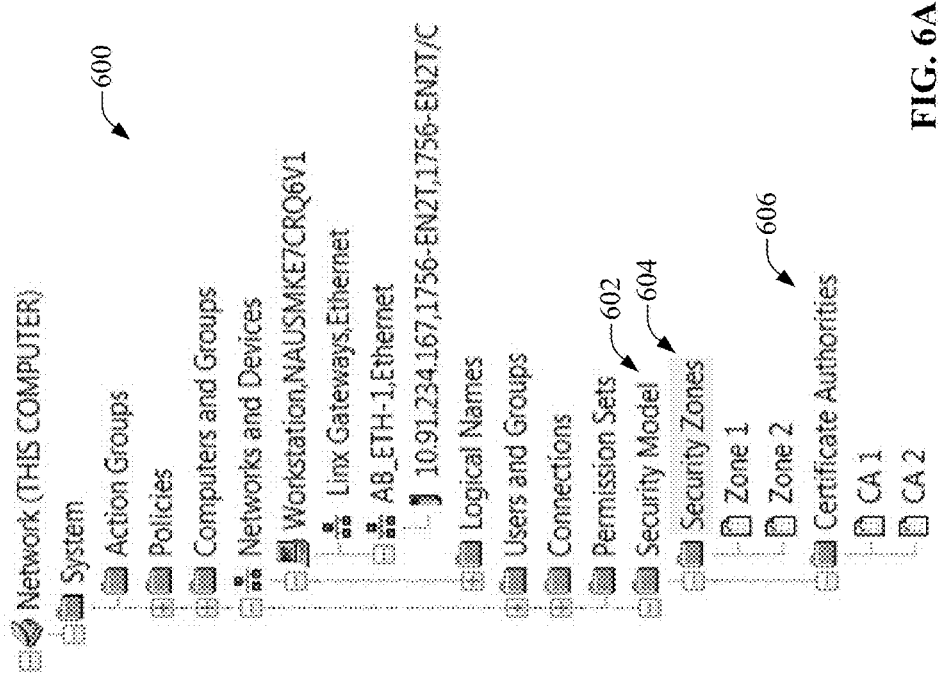
FIGS. 6A-6D are example configuration trees that can be rendered by a graphical interface component of a model-based security policy configuration system for display and configuration of security policies.
Figure 6B:
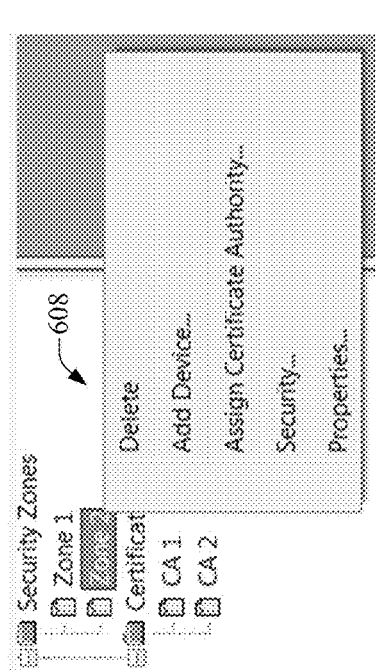

In still other embodiments, the graphical interface may render zones, devices, and other information as a hierarchical tree structure. In such embodiments, the interface may allow the user to create hierarchical nodes representing zones, and add devices to each defined Zone node as child nodes. The user can then set security attributes for each Zone and Device node (including defining any additional channels or conduits) using node-specific menus. FIGS. 6A-6D are example configuration trees that can be rendered by the graphical interface component 204 for display and configuration of security policies. In this example, the security configuration system is a component of a larger industrial asset management platform. As shown in FIG. 6A, configuration tree 600 includes a Security Model node 602, below which are a Security Zones node 604 and a Certificate Authorities node 606. Through interaction with the Security Zones node 604, a user can create any number of security zones. As shown in FIG. 6B, devices can then be added to each zone by invoking a pop-up menu 608 for a selected zone (e.g., by right-clicking on the selected zone's icon) and selecting a Add Device option, which can invoke a list of available devices that make up the set of industrial assets 408. The user can associate one or more devices with a zone by selecting the desired devices from this device list. Menu 608 also allows the user to assign a defined certificate authority to each zone, as well as to set other zone-level security attributes and properties for the zone. Zone-level attributes configured in this manner will be applied to all devices assigned to the zone.

Figure 6C:
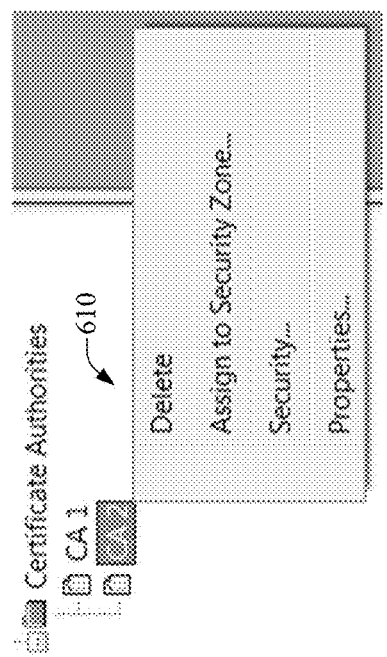

Example configuration tree 600 also allows the user to configure one or more certificate authorities through interaction with the Certificate Authorities node 606. As shown in FIG. 6C, the user may define any number of certificate authorities, and configure security attributes for each defined certificate authority by invoking a pop-up menu 610. Defined certificate authorities can then be assigned to any of the previously defined zones, if such zones are to be configured for certificate-based security.

Figure 6D:
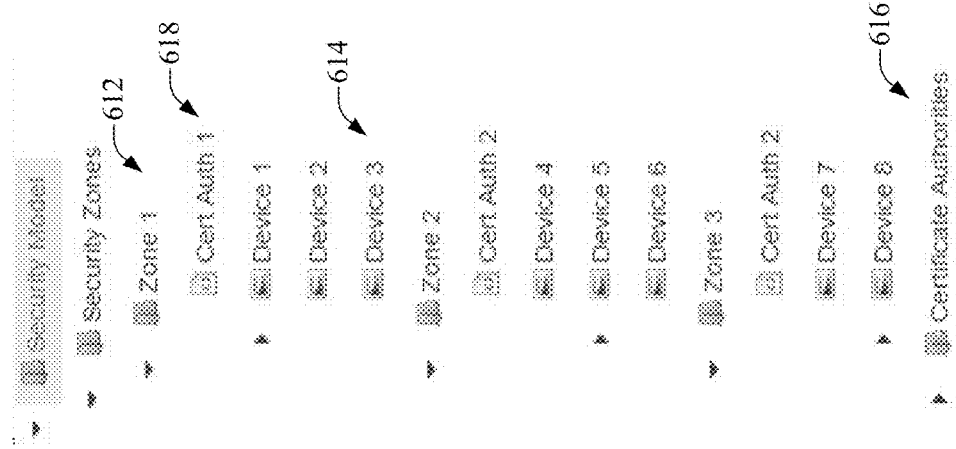

FIG. 6D is another example tree structure depicting the Zone nodes 612 expanded to display the devices associated with each zone, represented as Device nodes 614. In this example, the zones are configured to support certificate-based security, and as such each zone is associated with a selected certificate authority (defined under a Certificate Authorities node 616). Expanding a Zone node 612 also causes the certificate authority associated with that zone to be displayed as a CA node 618.

It is to be appreciated that embodiments of the security configuration system described herein are not limited to the tree-based configuration interfaces depicted in FIGS. 6A-6D. Rather, any suitable type of configuration interface—including but not limited to the table-based interface and icon manipulation interfaces described above—are within the scope of one or more embodiments of this disclosure.

Through interaction with the system's user interface, the security configuration system 202 allows the user to specify a number of different trust types for communication between the user's collection of industrial assets.

A Zone trust type specifies that all assets within the same security zone will trust one another. This trust type is represented by the circles enclosing the assets depicted in FIG. 3.

An Asset-Asset trust type specifies that an industrial asset in a first zone will trust an industrial asset in a different second zone. This trust type is represented by arrow 302 in FIG. 3.

An Asset-Zone trust type specifies that an asset in a first security zone will trust any asset from a specified second zone. This trust type is represented by arrow 306 in FIG. 3.

A Zone-Zone trust type specifies that any asset from a specified first zone is to trust all assets from a specified second zone. This trust type is represented by arrow 304 is FIG. 3.

For Asset-Asset, Asset-Zone, and Zone-Zone trust types, the system can further allow the user to define whether the trust is to be a one-way trust (only communication in one direction is allowed) or a two-way trust.

In one or more embodiments, these trust definitions represent "allow" rules; that is, the system allows the user to expressly define permitted data communications, and assumes that any type of communication not expressly allowed by a user-defined trust definition is to be considered a denied or unpermitted communication. In such embodiments, the system only requires security policies to be defined in terms of these "allow" rules, since the configuration system will configured the individual assets to deny any communication not expressly permitted.

Once one or more security zones have been defined, the graphical interface component 204 allows the user to define various zone-level security attributes for each zone. The configuration system will apply these zone-level security attributes to all devices within the zone. For example, the user may define the type of security to be used within each security zone. Example security types that may be configured for a zone include, but are not limited to, common industrial protocol (CIP) Security with Certificate, CIP Security with Pre-Shared Key (PSK), IP Block security, firewall rules, etc.

Selecting CIP Security with Certificate for a zone specifies that the selected zone contains devices that support CIP security, that share a common trust, and that have identities (certificates) issued by a specified trusted authority (e.g., a certificate authority defined by the user). When this type of security is set for a zone, the system also allows the user to select the identity of the certificate authority to be used in the zone (e.g., from a list of certificate authorities defined by the user).

Selecting CIP Security with PSK for a zone specifies that the selected zone contains CIP security devices that share a common pre-shared key. When this type of security is set for a zone, the system also allows the user to select a key attribute identifying a key to be used to enable communications within the zone. A given zone cannot be configured for both CIP security with Certificate and CIP Security with PSK.

Selecting IP Block security for a zone specifies that the selected zone contains industrial assets identified by individual IP addresses or a range of IP addresses. This type of security may be mixed with either CIP Security with Certificate or CIP Security with PSK in the same security zone.

The system can also allow the user to set other security attributes for a defined zone (e.g., allowed cipher suites, verify expirations, or other such security attributes). The system can also allow the user to set a number of attributes for the zone that are not specifically security related (e.g., disable HTTP, etc.).

In addition to zone-level attributes, the system also allows the user to set a number of asset-level attributes. These attributes are applied to specific industrial assets and devices. In some scenarios, some or all of these asset-level attributes may be read automatically by the configuration system as part of a device auto-discovery routine (implemented by the device discovery component 210). These manually provided or automatically discovered asset-level attributes are encoded in the model 216 together with the zone-level attributes. Asset-level attributes may include, for example, an asset type attribute used to classify the device and to render the device's capabilities in the model 216, port attributes that specify one or more mechanisms by which the asset communicates with other assets (e.g., specifying that the asset is to communicate via its Ethernet port, and setting an IP address for the device), or other such attributes.

As the industrial assets 408 are defined and grouped into security zones (and any desired conduits between devices and/or zones are defined), the model 216 is updated to record the set of industrial assets and the security relationships therebetween, as defined by the zones, conduits, channels, and any other zone-level and/or asset-level security attributes set by the user. The instruction translation component 206 translates the high-level, user-defined security policies—as defined by the zone, channel, and conduit definitions—into security configuration data 404 that can be sent to individual assets and devices to facilitate implementing the plant-wide security strategy. To this end, the instruction translation component 206 is preconfigured with a set of underlying translation rules designed to analyze the model 216, determine a set of vendor-specific device security configuration instructions that will implement the user-defined security policies, and deploy these security configuration instructions 404 to the respective industrial assets and devices to facilitate setting the appropriate device-level security parameters necessary to implement the desired plant-wide security strategy.

For example, if the plant-wide security strategy encoded in model 216 requires modification of a firewall configuration parameter on a firewall device residing on the plant network 406 (e.g., to either allow or block communication between two devices in accordance with the user's zone and conduit definitions), the instruction translation component 206 will generate a security configuration instruction formatted in accordance with the particular device vendor and device model of the firewall device, and designed to perform the necessary parameter modification on the firewall device. The communication component 208 then deploys this instruction over the plant network 406 to the firewall device to effectuate the modification. Other example configuration actions that may be implemented by the security configuration instructions may include modifying network addresses (e.g., IP addresses) or network address ranges on selected devices, enabling specific security modes on selected devices, enabling key-based or certificate-based security protocols in selected devices, distributing encryption keys or certificates to devices to facilitate secure communication (e.g., if the devices or zones are configured for key- or certificate-based security), updating one or more whitelists that explicitly identify devices that are permitted to communicate with a given device, modifying router or switch settings, or other such actions. The instruction translation component 206 generates such security configuration instructions for all necessary device-level security parameter changes required to implement the security strategy defined by the user-defined zone and conduit specifications. Since a given set of heterogeneous industrial assets may support different security technologies, the system is capable of implementing the defined global security strategy using more than security enforcement technology for a given set of industrial devices Since the instruction translation component 206 is pre-configured with translation instructions for a variety of different device vendors, the security configuration system 202 can implement the user's specified security strategy even if the collection of industrial assets is made up of devices from multiple different vendors. The security configuration system 202 thus provides the user with a simple, vendor-agnostic interface for defining a plant-wide security strategy for a collection of industrial assets, and translates this strategy into a set of vendor- and device-specific security configuration instructions which are then deployed to the appropriate devices. By abstracting the user from the device-specific technical details of configuring security settings and modes for each individual device, the system mitigates the need for the user to possess an in-depth technical knowledge of specific device types and vendors in order to configure device-level security as part of a larger, plant-level security strategy.

In one or more embodiments, instruction translation component 206 can also generate some portions of the security configuration data based further on global or user-defined business rules 218 maintained by the security configuration system 202. These business rules 218 can enforce one or more high-level preferences or constraints relating to configuration of security policies between zones and devices. For example, business rules 218 may define that devices made by two specified product vendors cannot be part of a common security zone that uses PSK security due to conflicts between those two vendors' products. In general, certain security configuration requests may not be enforceable due to technical conflicts between device models or device vendors, and business rules 218 can define such conflicts. Based on these encoded business rules 218, the instruction translation component 206 can determine when the user's configuration input 402 has requested an unenforceable security policy, and generate suitable feedback notifying the user that the requested policy cannot be implemented.

Business rules 218 can also define criteria to be used to resolve scenarios in which there are multiple ways to configure the industrial assets 408 to implement a requested security policy. In an example scenario, the user may group a subset of industrial assets within a common security zone with no channels or conduits designated between the zone and other defined zones, thereby implementing a security policy whereby the subset of industrial assets are permitted to exchange data with one another while communication with other devices within the industrial environment (outside the security zone) is to be prohibited. Based on the particular combination of industrial assets and network architecture devices that make up the networked system, the networked connections between the devices, and the models and/or vendors of the respective devices (all of which can be determined by the system 202 based on analysis of the model 216), the instruction translation component 206 may determine that there are multiple configuration possibilities for implementing this security strategy. For example, there may be more than one set of security settings for a particular firewall device or router that will deny external communication requests directed to the assets within the zone. Accordingly, the instruction translation component 206 can select one of the available approaches based on one or more resolution criteria defined by the business rules 218.

In another example, the system may determine that it is possible to implement a requested security strategy by reconfiguring either of a first device or a second device, and the business rules 218 may define a rule that assists the system 202 to select the device reconfiguration option that best conforms to a defined preference (e.g., a preferred device vendor, a preference for key-based security over certificate-based security, etc.). In various embodiments, the business rules 218 may define explicit preferences for configuration approaches (e.g., a preferred type of security, a preferred device vendor to be used for filtering of communications, etc.) or may define one or more constraints to be applied when resolving configuration conflicts (e.g., an instruction to select a strategy requiring the fewest number of device reconfigurations).

In some embodiments, business rules may also identify potential conflicts between enforcement solutions before or after such solutions are deployed. In such embodiments, the system may perform real-time monitoring of the devices involved in the security policy to ensure that subsequent re-configurations of the devices do not conflict with a previously established security policy. For example, after deployment of a security strategy by the system, whereby secure communication between two devices is established, a user may use an independent configuration tool to re-configure a network infrastructure device (e.g., a firewall) in such a way as to block communications between the two devices, inadvertently conflicting with the security policy previously established by the security configuration system. Based on the model and the business rules, the system may detect such re-configurations, determine that the re-configuration conflicts with the previously defined security policy, and perform an action in response to this determination. The action may comprise, for example, delivering a notification message to one or more personnel responsible for administering the security strategy, automatically returning the affected device to its previously configured security settings (i.e., over-riding the re-configuration), or other such actions. In this way, the modeling tool and business rules can enforce defined security policies in real-time, easily identifying policy conflicts that would otherwise be difficult to track.

FIGS. 7-13 and the associated descriptions below illustrate a number of example security strategies that can be implemented using the security configuration system 202.

Figure 7A:
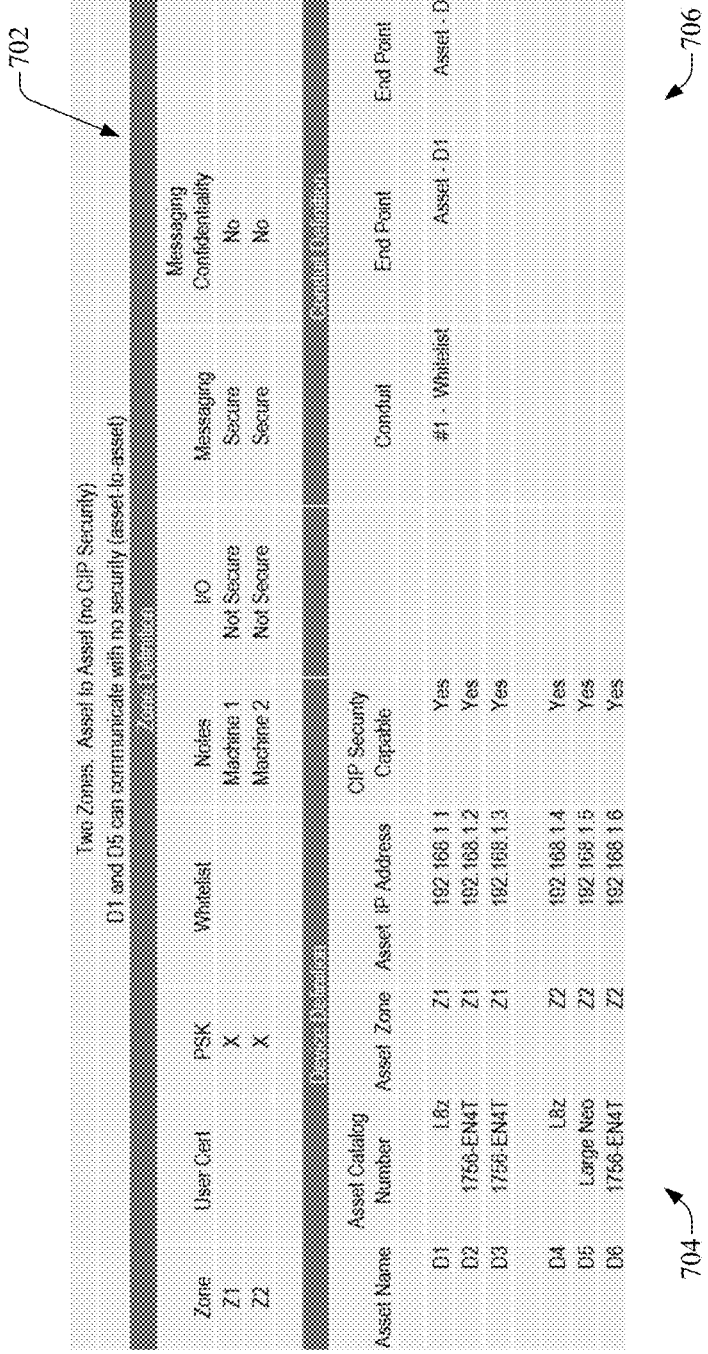
FIG. 7A is a table illustrating example configuration input that can be provided to a security configuration system by a user in order to implement a security policy.
Figure 7B:
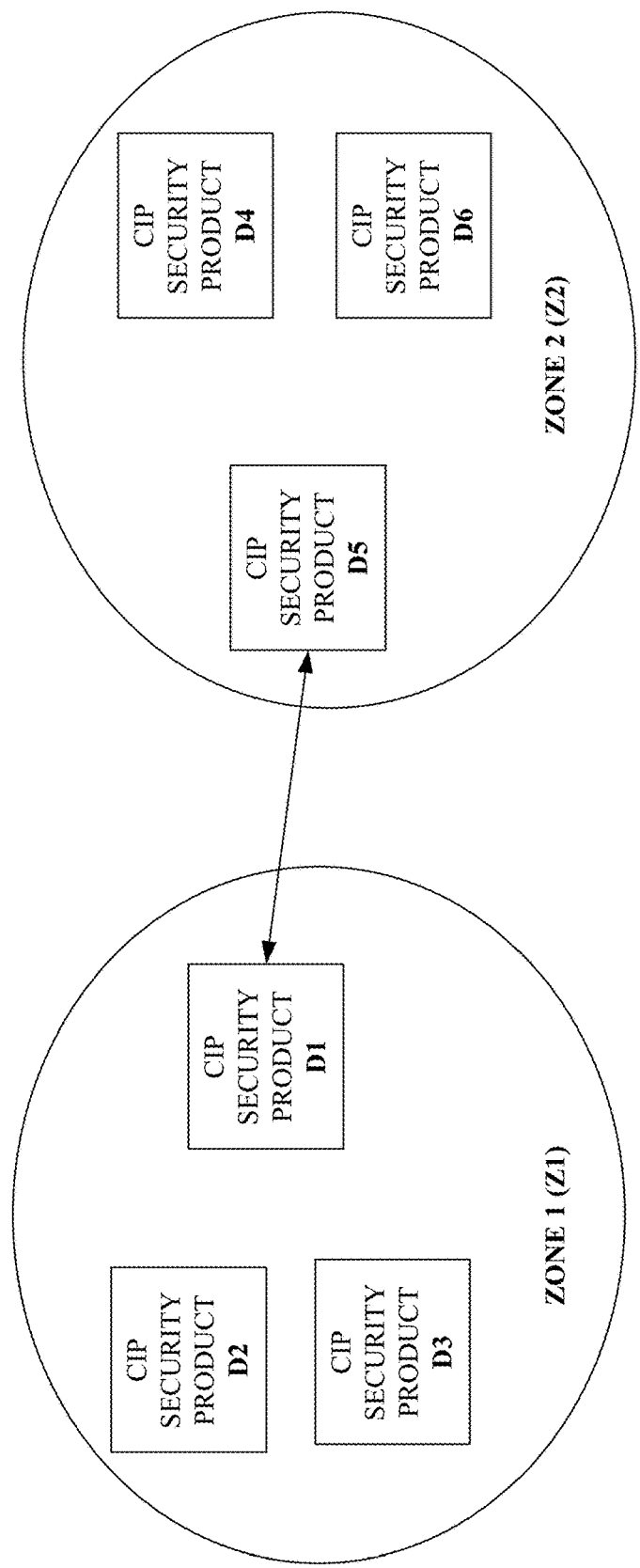
FIG. 7B is a diagram depicting the security strategy implemented by the security policy configuration system in accordance with the user-provided configuration input depicted in FIG. 7A.

FIGS. 7A and 7B depict a security policy comprising two security zones and an asset-to-asset conduit, in which all assets comprise devices that support CIP security. FIG. 7A is a table illustrating configuration input provided to the security configuration system 202 by a user in order to implement the security policy. As noted above, this configuration input can be received via interaction with one or more user interface displays generated by the graphical interface component 204, where the interface displays can conform to any suitable format in accordance with various embodiments. In one or more embodiments, the graphical interface component 204 may display one or more tables similar in format to those depicted in FIG. 7A. For example, the graphical interface component 204 may generate and display a Zone Definition table 702 for entry of zone definition information, and a Conduit Definition table 706 for entry of conduit definition information. The Zone Definition table 702 may include fields for assigning a zone name to a new zone, selecting a type of security to be used within each zone (e.g., user certificate, PSK, whitelist, etc.), indicating whether I/O and/or messaging within the zone is to be secure, and other such zone-level definitions. The Conduit Definition table 706 may include fields for assigning a conduit name for each conduit to be created, and identifying the two end point devices for which communication is to be allowed.

A Device Definition table 704 may include information defining the inventory of industrial assets and devices for which the plant-wide security strategy is to be implemented. For embodiments that support auto-discovery, at least some of this device information may be discovered automatically by the device discovery component 210, including but not limited to asset catalog numbers and current IP addresses, and indications as to whether each device supports CIP security. Alternatively, some or all of the industrial asset information may be manually provided to the system 202 by the user.

As also noted above, as an alternative to interactive tables, the zone and conduit information may be defined by the user via manipulation of graphical icons presented by the graphical interface component 204. In such embodiments, the graphical interface may have a format similar to that depicted in FIG. 3 (or FIG. 7A), in which the industrial assets are represented by icons, and the user can define security zones represented by circles that group the asset icons into zones. This graphical interface can also allow the user to create one-way or two-way arrows between zones, between a zone and a device, or between devices in order to define channels and conduits.

In yet another interface example, some or all of the information depicted in FIG. 7A may be provided through interaction with a hierarchical tree structure, such as those depicted in FIGS. 6A-6D.

Once the user has provided definitions for zone groupings and any desired conduits, the model 216 is updated to reflect these security preferences. The instruction translation component 206 then generates and deploys appropriate device-level, model- and vendor-specific security configuration instructions to any of the devices determined to require reconfiguration in order to implement the specified plant-wide security strategy. FIG. 7B is a diagram depicting the security strategy implemented by the system in accordance with the user-provided configuration input depicted in FIG. 7A. In this example, the industrial assets comprise six devices D1-D6 that are grouped into two zones Z1 and Z2 (as indicated in the Device Definition section of FIG. 7A). The devices all support CIP security, and so are capable of exchanging data securely. In accordance with the zone groupings defined by the user, the instruction translation component 206 generates and deploys any device-level security configuration instructions necessary to allow devices D1-D3 to securely exchange data with one another in accordance with their Zone 1 designation, and to allow devise D4-D6 to securely exchange data with one another in accordance with their Zone 2 designation. In this example, both Zone 1 and Zone 2 devices are configured to use PSK security for data exchange, in accordance with the zone-level security types specified by the user (see the Zone Definition table 702).

In addition, the user has defined a conduit between devices D1 and D5, which reside in different zones. A conduit can be considered a group of one or more one-way channels between two assets or zones. In this example, the conduit is a two-way communication permission between devices D1 and D5. Similar to the zone definitions, when the user defines a conduit between devices D1 and D5 (as indicated by the Conduit Definition table 706, in which D1 and D5 are identified as endpoints of the conduit), the instruction translation component 206 generates and deploys appropriate device-level security configuration instructions to any of device D1, device D5, and/or any intermediate network architecture devices (e.g., hubs, routers, switches, firewalls, etc.) in order to allow devices D1 and D5 to securely exchange data in accordance with the conduit definition. Since all assets in this example, support CIP security, data exchange between the designated devices is secure.

Since devices D1-D6 (as well as any intermediate network infrastructure devices) may comprise devices made by different device vendors, the instruction translation component 206 will—based on analysis of model 214—identify the devices that require new security settings, determine the vendor and/or model information of those devices, and generate suitable vendor- and model-specific security configuration instructions for the respective devices. The instruction translation component 206 can generate these vendor-specific instructions based on underlying translation code maintained and executed by the security configuration system 202. In this way, the system allows the user to define a vendor-agnostic, plant-wide security strategy at a high level, abstracting the user from the vendor- and device-specific technical details associated with configuring device settings on each individual device.

Figure 8B:
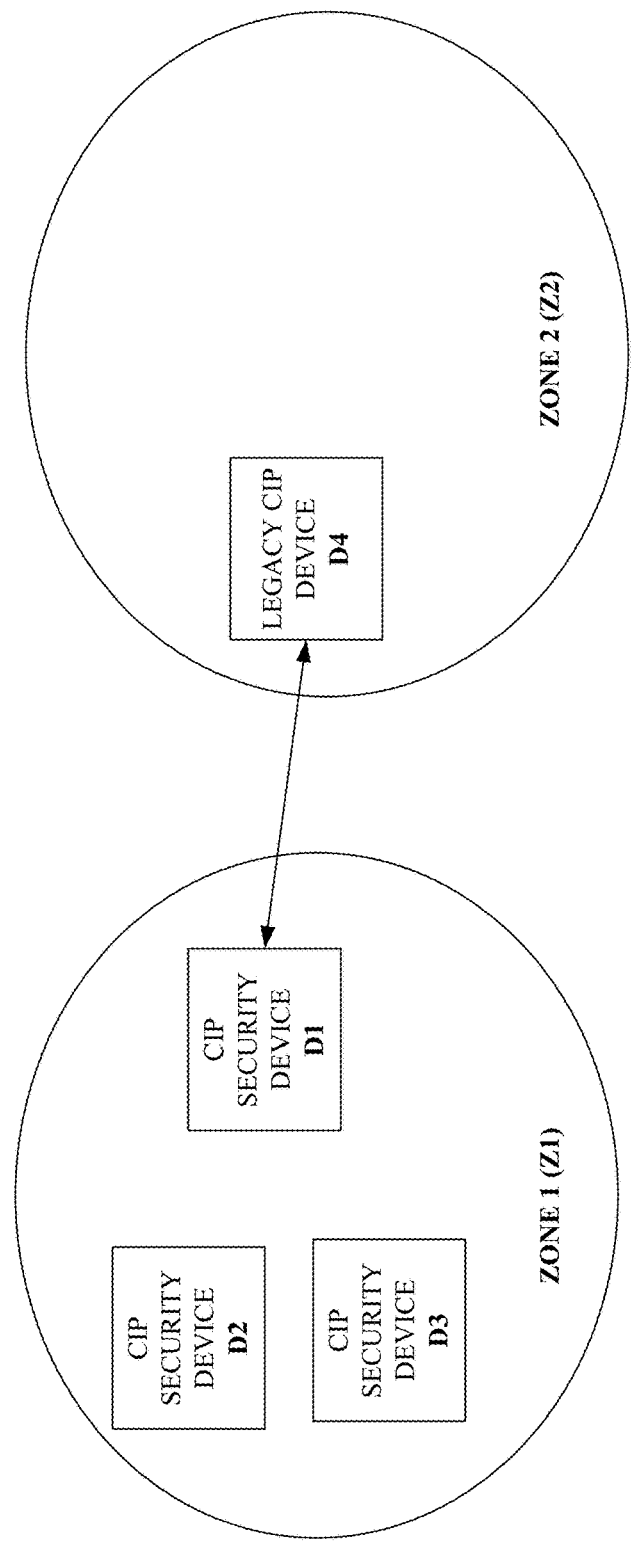
FIG. 8B is a diagram depicting the security strategy implemented by the security policy configuration system in accordance with the user-provided configuration input depicted in FIG. 8A.

FIGS. 8A and 8B illustrate another example security strategy that can be implemented by security configuration system 202. FIG. 8A is a table illustrating example user configuration input that can be provided to (or, in some cases, automatically discovered by) security configuration system 202, and FIG. 8B is a diagram representing the security policy. In this example, devices D2-D3 all support CIP security and are assigned to the same zone (Zone 1). Device D4, assigned to Zone 2, is a legacy product that does not support CIP security. An asset-to-asset conduit has been defined to allow communication between device D1 and legacy device D4. Since devices D1-D3 support CIP security, data exchange between these devices is performed securely. Since device D4 does not support CIP security, data exchange between D1 and D4 is permitted by virtue of the defined conduit between those two devices, but is not secure.

Figure 9B:
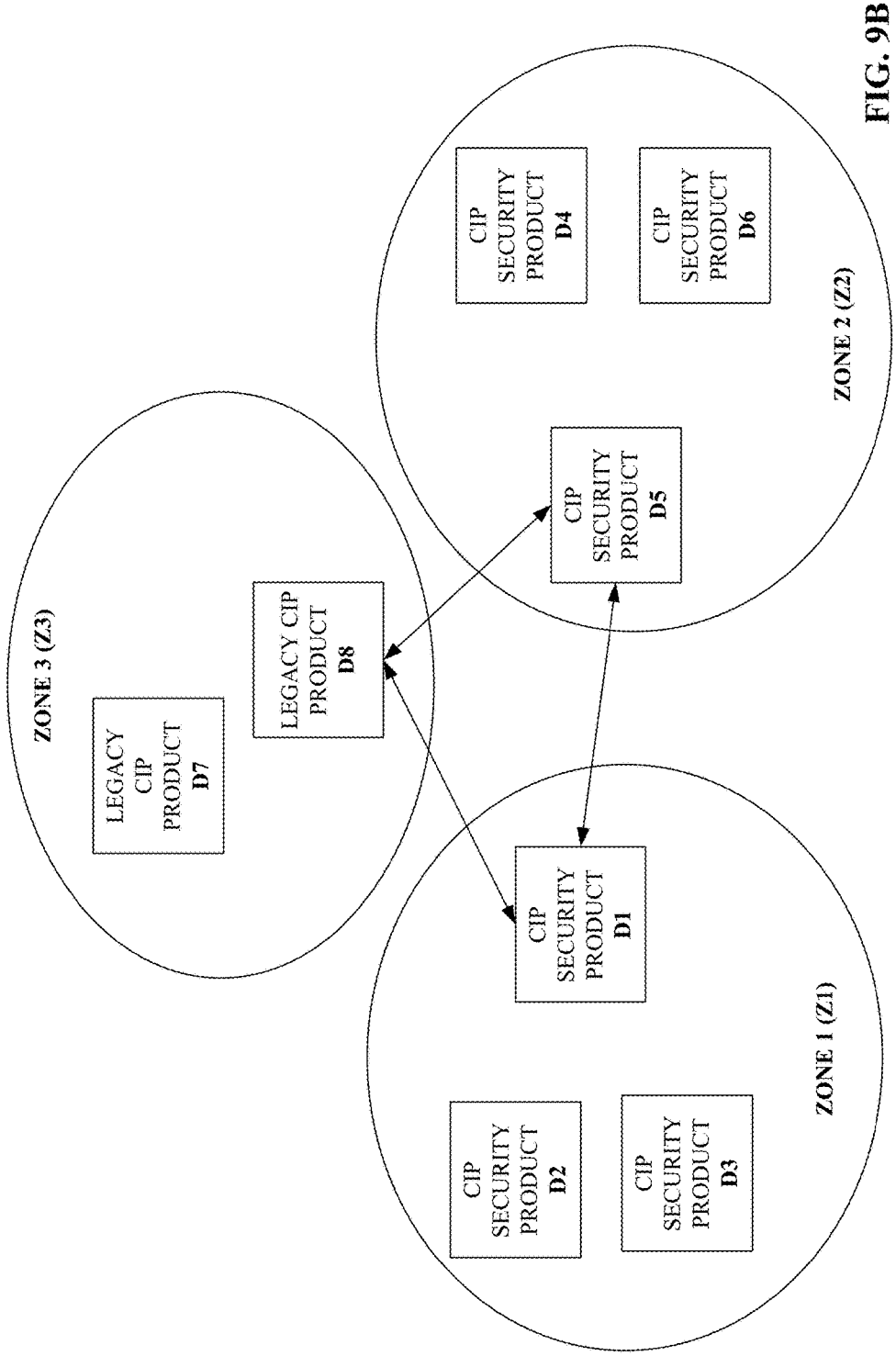
FIG. 9B is a diagram depicting the security strategy implemented by the security policy configuration system in accordance with the user-provided configuration input depicted in FIG. 9A.

FIGS. 9A and 9B illustrate another example security strategy that can be implemented by security configuration system 202. FIG. 9A is a table illustrating example user configuration input that can be provided to (or, in some cases, automatically discovered by) security configuration system 202, and FIG. 9B is a diagram representing the security policy. In this example, the industrial assets comprise a mix of devices that support CIP security and that do not support CIP security (legacy devices). Three security zones have been defined, with devices D1-D3 assigned to Zone 1, D4-D6 assigned to Zone 2, and legacy devices D7 and D8 assigned to Zone 3. When this policy is implemented, the devices in each of Zones 1 and 2 can communicate securely with other devices in the same zone, while Devices D7 and D8 can communicate with each other without security.

Three asset-to-asset conduits have been defined in this scenario. D1 and D5 have been configured to communicate securely with one another. Two non-secure communication paths—between D5 and D8 and between D1 and D8—have also been established in accordance with the user's configuration input. Since D8 is a legacy device that does not support CIP security, these two conduits are unsecure, but asset-to-asset communication to this device is still permitted.

Figure 10B:
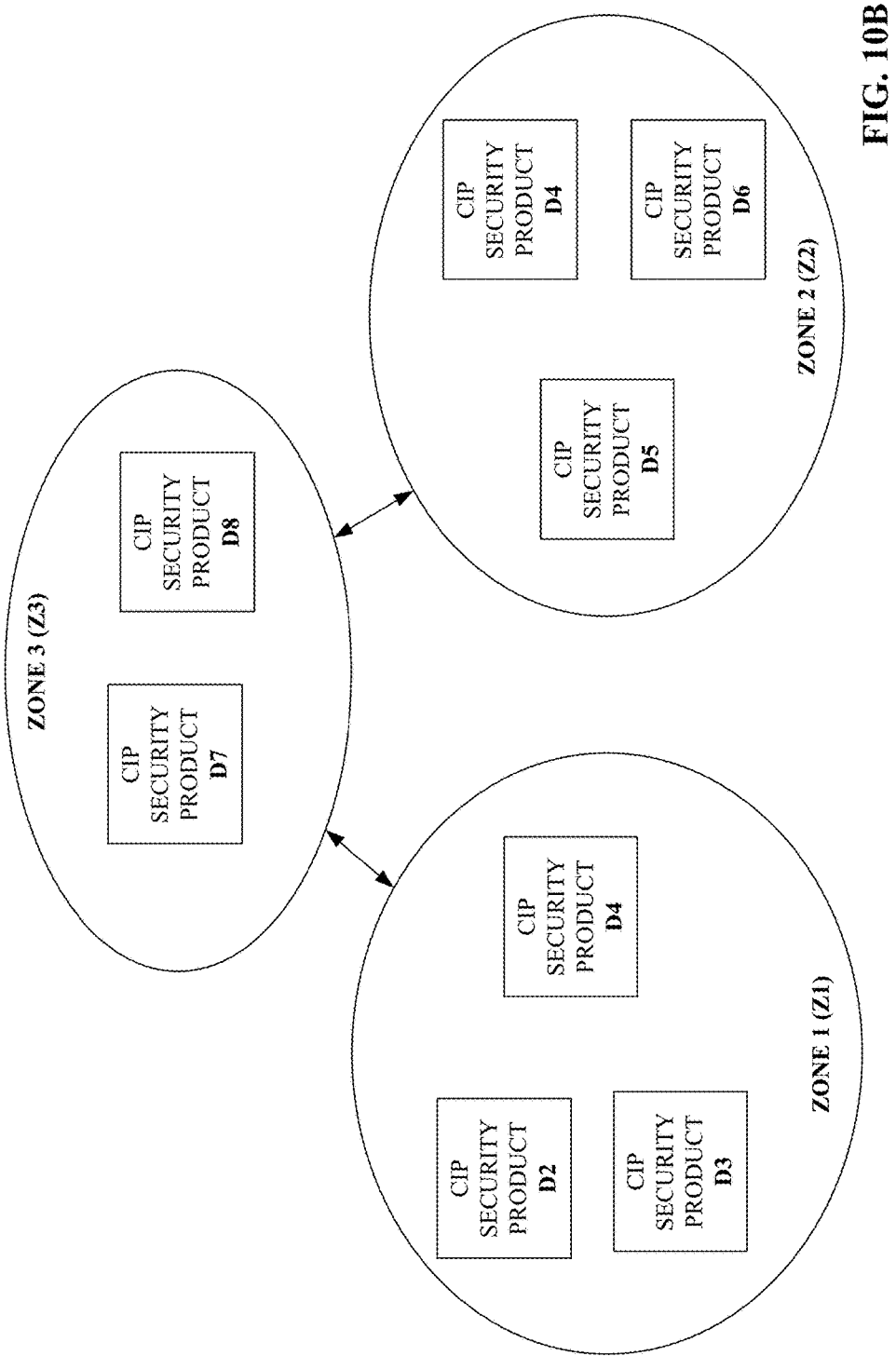
FIG. 10B is a diagram depicting the security strategy implemented by the security policy configuration system in accordance with the user-provided configuration input depicted in FIG. 10A.

FIGS. 10A and 10B illustrate another example security strategy that can be implemented by security configuration system 202. FIG. 10A is a table illustrating example user configuration input that can be provided to (or, in some cases, automatically discovered by) security configuration system 202, and FIG. 10B is a diagram representing the security policy. This example illustrates configuration of zone-to-zone conduits by the system. Industrial assets D1-D8 have been segregated into three security zones, as described in previous examples. In addition to the intra-zone communication permitted by the zone groupings, two zone-to-zone conduits have been configured—a first conduit between Zones 1 and 3 and a second conduit between Zones 2 and 3. As can be seen in the table of FIG. 10A, a zone-to-zone conduit is defined by specifying the zones that are to be permitted to communicate as the two endpoints of the conduit.

A zone-to-zone conduit specifies that all devices within a first zone are to be permitted to communicate with any device within a second zone. Depending on a preferred type of security specified by the user configuration input, the instruction translation component 206 may implement these zone-to-zone conduits by updating a whitelist on firewall devices at zone boundaries, appropriately configuring the IP addresses of the devices in the respective zones, distributing public and/or private keys or certificates to the appropriate devices to permit secure communication between the devices, or other such configuration actions. In the present example, all zones are configured to use certificate-based security, in accordance with the user's specification. However, the system allows the user to individually select the type of security (e.g., certificate, PSK, whitelisting, etc.) for each defined zone. Devices and zones can be configured to use different types of security if desired, provided the mix of security types is enforceable given the specific collection of industrial assets to be configured.

Figure 11B:
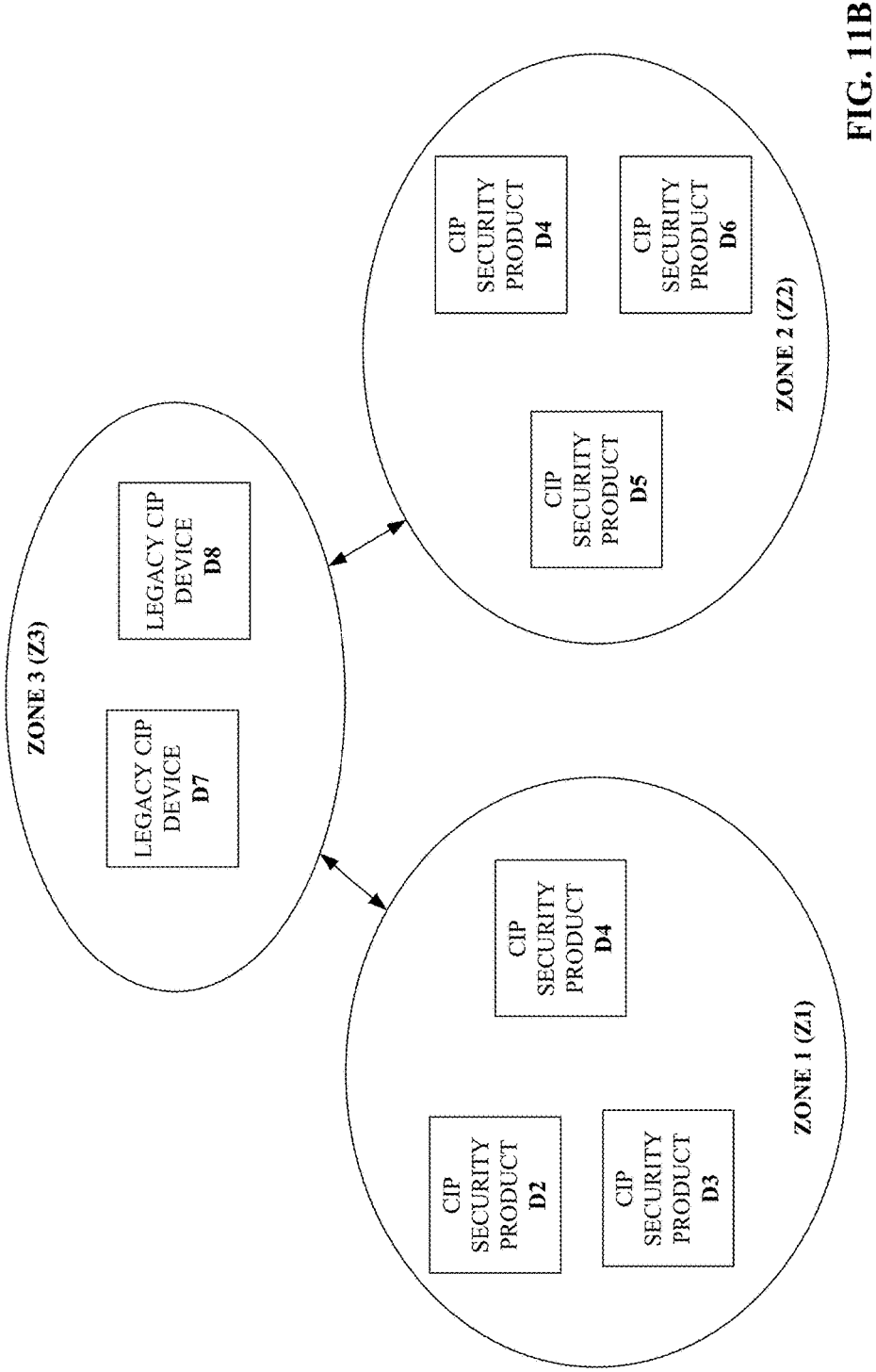
FIG. 11B is a diagram depicting the security strategy implemented by the security policy configuration system in accordance with the user-provided configuration input depicted in FIG. 11A.

FIGS. 11A and 11B illustrate another example security strategy that can be implemented by security configuration system 202. Similar to the example described above in connection with FIGS. 10A and 10B, three zones and two zone-to-zone conduits have been defined. In this example, the assets comprise a mix of devices that support CIP security and legacy devices that do not support CIP security, with the legacy devices assigned to Zone 3. As can be seen in the configuration table of FIG. 11A, no security is configured for Zone 3 due to the limitations of the legacy devices.

Figure 12B:
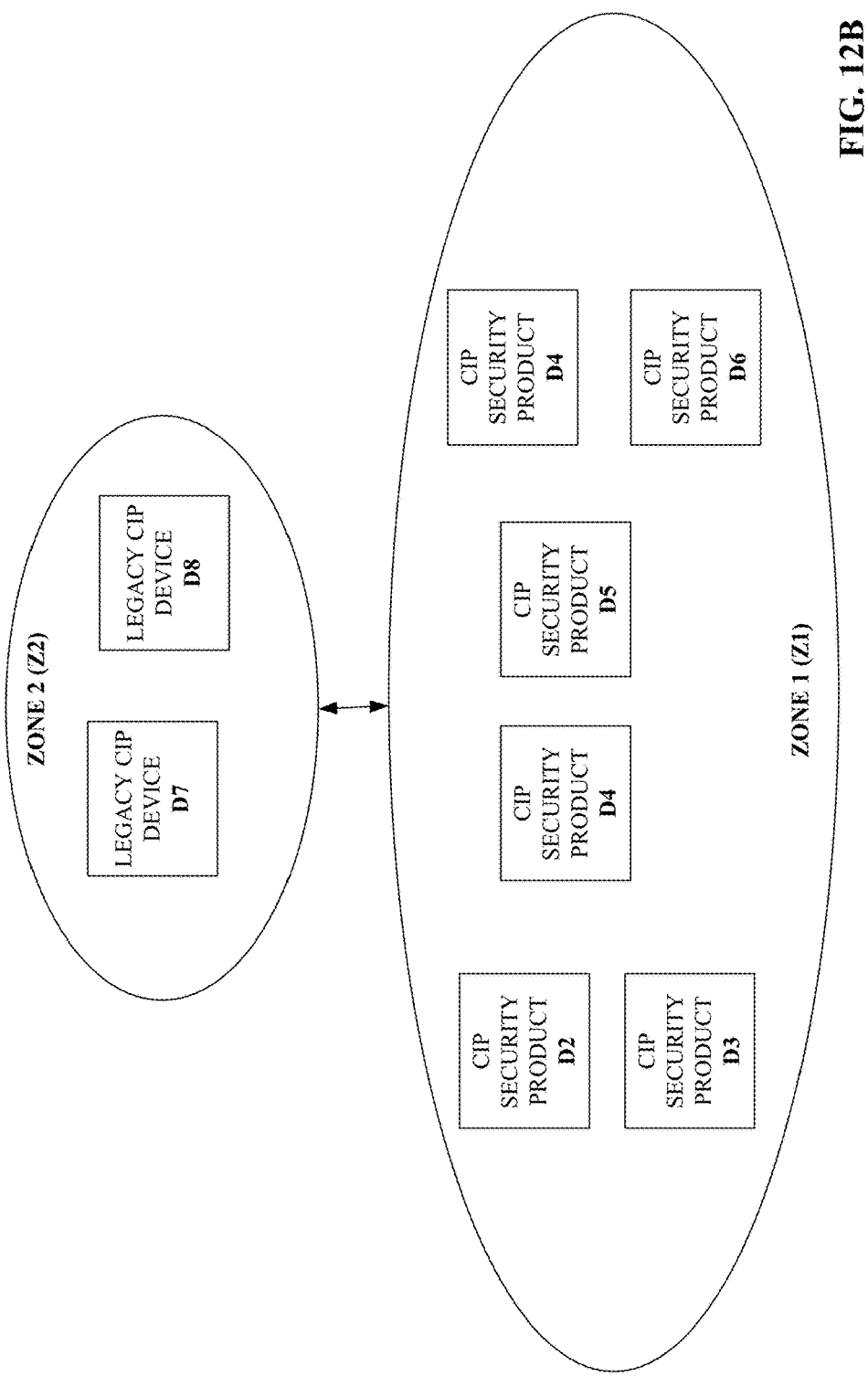
FIG. 12B is a diagram depicting the security strategy implemented by the security policy configuration system in accordance with the user-provided configuration input depicted in FIG. 12A.

FIGS. 12A and 12B illustrate another example security strategy that can be implemented by security configuration system 202. This example depicts two zones, with a set of devices supporting CIP security assigned to Zone 1 and a pair of legacy devices that do not support CIP security assigned to Zone 2. In addition, a zone-to-zone conduit is configured to allow communication between the zones. In this example, Zone 1 is configured to allow secured communication between its devices using vendor certificate security. The zone-to-zone conduit allows communication between the Zone 1 and Zone 2 devices, which is unsecured due to the inability of the legacy devices to support CIP security.

Figure 13B:
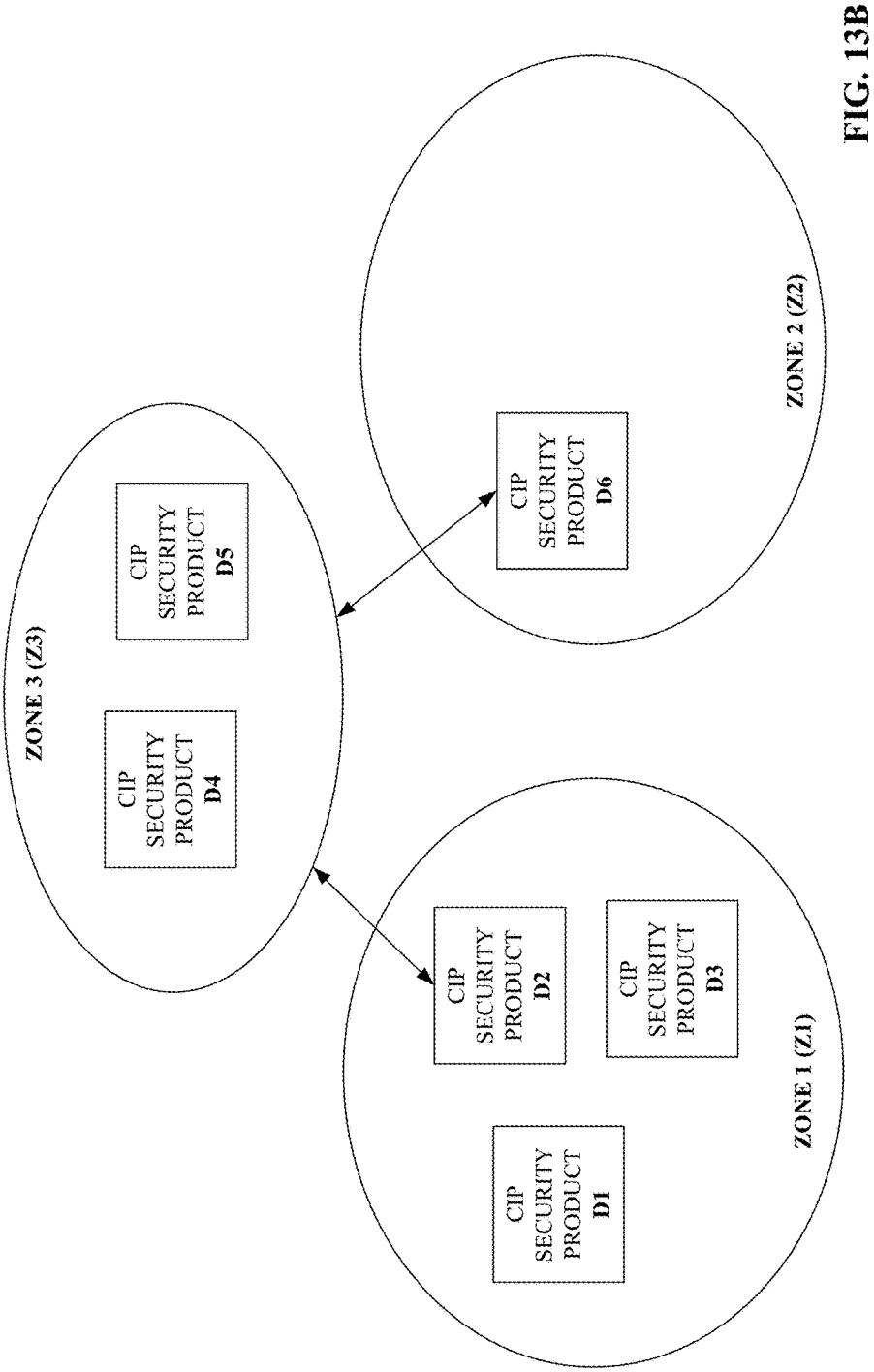
FIG. 13B is a diagram depicting the security strategy implemented by the security policy configuration system in accordance with the user-provided configuration input depicted in FIG. 13A.

FIGS. 13A and 13B illustrate another example security strategy that can be implemented by security configuration system 202. Similar to some previous examples, the set of industrial assets are grouped into three zones. In this example, two asset-to-zone conduits have also been defined—a first conduit between device D2 to Zone 3, and a second conduit between device D6 and Zone 3. As shown by the conduit configuration data depicted in FIG. 13A, each asset-to-zone conduit is defined by identifying the asset and the zone that make up the respective endpoints of the conduit. This configuration allows devise D2 and D6 to securely communicate with any of the devices in Zone 3, while preventing the other devices in Zone 1 (D1 and D3) from communicating with any of the devices in Zone 3 or Zone 2. Devices within each zone are configured to securely communicate with each other by virtue of the zone definitions, which are configured to use user certificate security for intra-zone data exchanges.

It is to be appreciated that the configurations depicted in FIGS. 7-13 are only intended to be exemplary and non-limiting, and that the system can facilitate implementation of any enforceable security policy that can be defined in terms of zones and conduits for a given collection of industrial assets making up one or more industrial automation systems. As noted above, the system is capable of making determinations as to whether a requested security policy, or portion of a requested security policy, is enforceable given the collection of assets for which security is to be implemented. Policy requests that are determined to be non-enforceable (e.g., due to improper mixes of requested security types, inability of one or more devices to support a requested security configuration, mixes of device vendors that are not capable of communicating or sharing a common security policy, etc.) will be detected by the system during configuration, and the system will notify the user if a requested configuration is not capable of being implemented.

Figure 14:
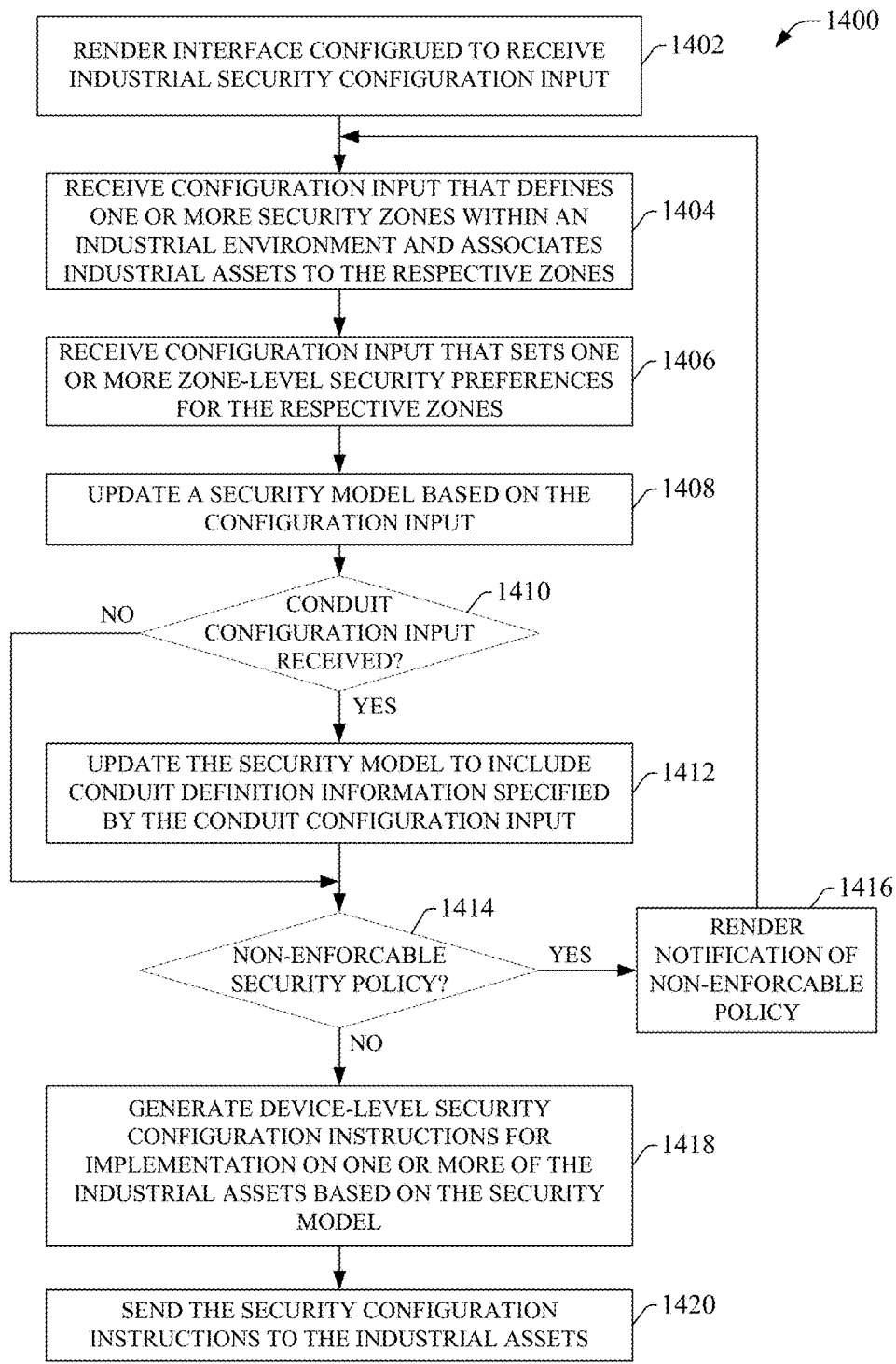
FIG. 14 is a flowchart of an example methodology for configuring and implementing a plant-wide security strategy using a model-based industrial security configuration system.

FIG. 14 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for configuring and implementing a plant-wide security strategy using a model-based industrial security configuration system. Initially, at 1402, an interface is rendered that is configured to receive industrial security configuration input. In one or more embodiments, this interface may comprise an interactive hierarchical tree structure that allows the user to define one or more security zones as nodes of the tree structure, and to assign respective industrial assets making up an industrial system to the respective zones as child nodes under the zone nodes. In another example, the interface may comprise one or more tables that allow the user to enter security zone definition information in tabular format. Such tables may also tabulate the industrial assets that comprise the industrial system for which a security policy is to be configured, and allow the user to associate each device with a defined zone by entering appropriate data table values. In still other example embodiments, the interface may comprise an interactive icon-based graphical display that allows the user to assign devices to selected security zones via manipulation of graphical icons representing the various industrial assets. For example, the interface may allow the user to drag-and-drop industrial asset icons to selected circles representing defined security zones, thereby associating the icons with the selected zones.

At 1404, configuration input is received via the interface that defines one or more security zones within an industrial environment, and associates industrial assets to the respective zones (e.g., using one of the example techniques described above for entering this security configuration input). Each zone defines a group of industrial assets that share common security requirement (defined by zone-level security attributes set via the interface), and which are permitted to exchange data with one another. At 1406, further configuration input is received that sets one or more zone-level security preferences for the respective zones. For example, using the interface, the user may define, for each zone, a type of security to be used for intra-zone data communication between industrial assets within that zone (e.g., user certificate, vendor certificate, PSK, whitelisting, etc.).

At 1408, a security model is updated based on the configuration input received at steps 1404 and 1406. This model records information regarding the industrial assets that make up the industrial system or plant for which a security policy is to be implemented (e.g., device models, device types, network addresses, device capabilities, etc.), network infrastructure devices that comprise the backbone of the networks on which the industrial assets reside, connectivity information between the assets and network infrastructure devices, the zone definitions specified by the configuration information, and/or other such information.

At 1410, a determination is made regarding whether conduit configuration input has been received via the interface. If such conduit configuration input has been received (YES at step 1410), the security model is further updated at step 1412 to include conduit definition information specified by the received conduit configuration input. This conduit configuration input may specify one or more of an asset-to-asset conduit, an asset-to-zone conduit, or a zone-to-zone conduit. In one or more embodiments, the interface may allow the user to define a conduit by identifying the two endpoints of the conduit, where each endpoint may comprise a device or a zone. A conduit specifies a permitted line of communication between the two specified endpoints.

Once the conduit configuration input has been received and the security model is updated, or if no conduit configuration is received (NO at step 1410), the methodology moves to step 1414, where a determination is made (based on an analysis of the security model) regarding whether any of the configuration input received at steps 1404, 1406, or 1410 define a non-enforceable security strategy. Non-enforceable security strategies may include, for example, requests to apply a set of security requirements to an asset that is not capable of supporting the specified security requirements, requests to allow secure data communication between two industrial assets that are not capable of sharing information, or other such non-enforceable policies. If the system identifies one or more non-enforceable policies based on the analysis of the security model (YES at step 1414), the methodology moves to step 1416, where the interface renders a notification of the one or more non-enforceable policies, and returns to step 1404 to allow the user to modify any of the previously entered configuration data in order to eliminate the non-enforceable policy. In one or more embodiments, the system may generate one or more recommendations based on the previously provided configuration data for modifying the configuration requests in a manner that yields an enforceable plant-wide security policy.

Once the security model has been completed and has been determined to comprise only enforceable security policies (NO at step 1414), the methodology proceeds to step 1416, where the system generates a set of device-level security instructions for implementation on one or more of the industrial assets. These security configuration instructions are generated based on an analysis of the security model, which in turn is generated based on the configuration input provided by the user. In one or more embodiments, the system that generated the interface at step 1402 maintains a translation engine capable of converting the security policy configuration information provided in previous steps into device- and vendor-specific security configuration instructions that, when executed on the individual target assets, will implement the plant-wide security strategy defined in previous steps. These configuration instructions may comprise, for example, network address settings, whitelist entries, instructions to enable selected device-level security features, security key or certificate information, messages indicating to one or more devices a certificate authority that should be used for secure communications, firewall device settings, or other such instructions. The system's translation engine can include knowledge of the types and formats of security configuration instructions supported by a range of different device types and vendors, allowing the system to appropriately map the security policies defined by the model to a set of vendor- and model-specific device-level security configuration instructions in order to implement the defined security policy. At 1420, the security configuration instructions are sent to the appropriate industrial assets on the plant floor (e.g., via the plant network).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
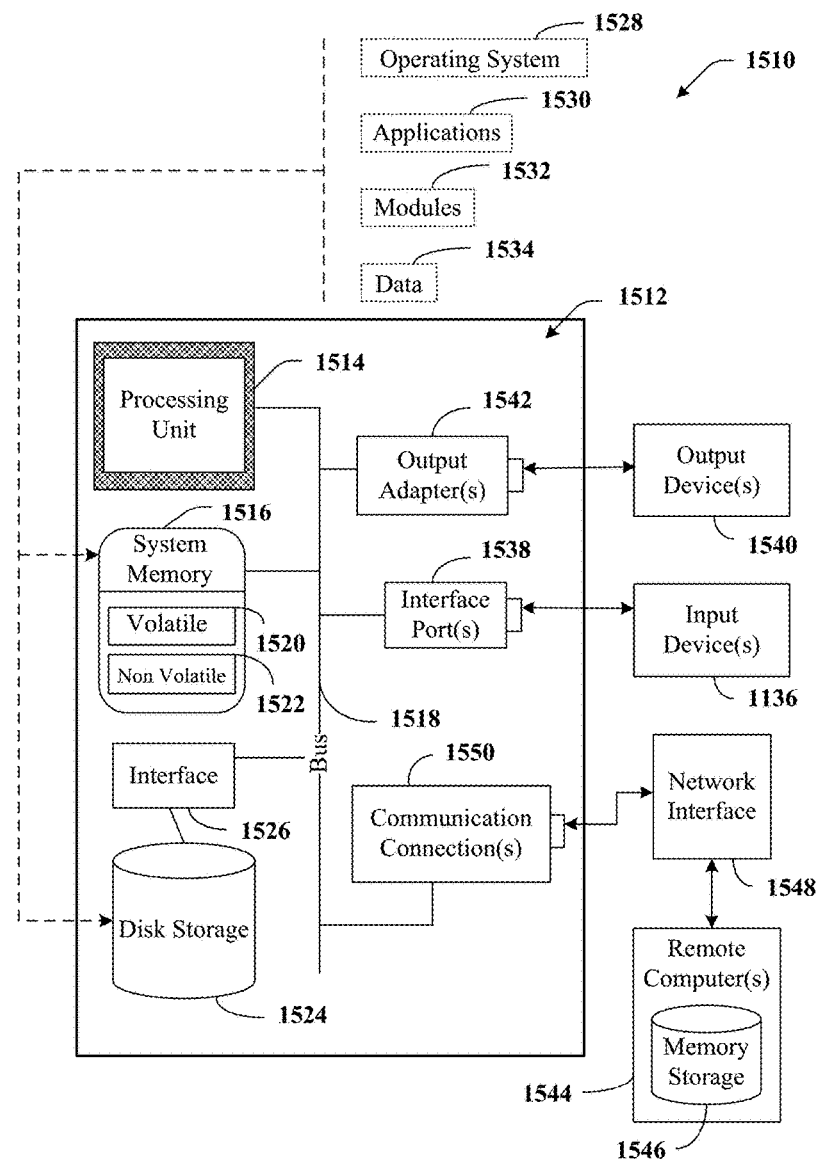
FIG. 15 is an example computing environment.
Figure 16:
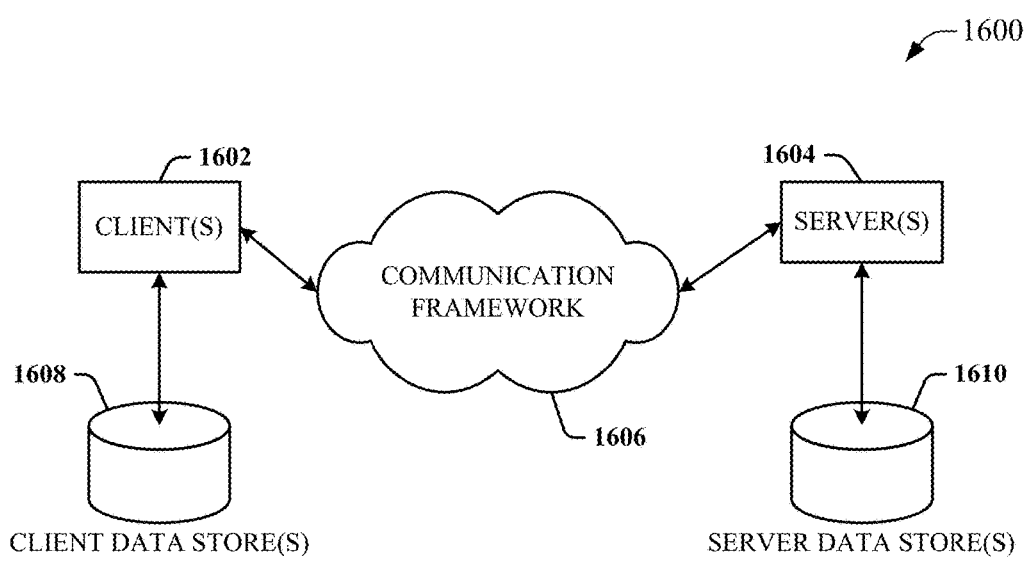
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, an example environment 1510 for implementing various aspects of the aforementioned subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Multi-core microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable PROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer 1512. System applications 1530 take advantage of the management of resources by operating system 1528 through program modules 1532 and program data 1534 stored either in system memory 1516 or on disk storage 1524. It is to be appreciated that one or more embodiments of the subject disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapters 1542 are provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1548 can also encompass near field communication (NFC) or Bluetooth communication.

Communication connection(s) 1550 refers to the hardware/software employed to connect the network interface 1548 to the system bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for configuring security in an industrial environment, comprising:
   memory that stores executable components;
   one or more processors, operatively coupled to the memory, that execute the executable components, the executable components comprising:
      an interface component configured to generate a graphical interface and to receive, via interaction with the graphical interface,
         zone configuration input that assigns respective industrial assets to security zones, and
         conduit configuration input that specifies an allowed communication path between a first industrial asset of the industrial assets and a second industrial asset of the industrial asset, wherein the first industrial asset and the second industrial asset are assigned to different security zones of the security zones;
      an instruction translation component configured to:
         reference security model data defining vendor and model information for the industrial assets, and
         generate, based on the security model data, one or more security configuration instructions directed to one or more of the industrial assets based on the zone configuration input and the conduit configuration input, wherein the one or more security configuration instructions are configured to set respective asset-level security settings on the one or more of the industrial assets to allow communication between a subset of the industrial devices defined to a common zone of the security zones in accordance with the zone configuration input, and to allow communication between the first industrial asset and the second industrial asset in accordance with the conduit configuration input; and
      a communication component configured to send the one or more security configuration instructions to the one or more of the industrial assets.

2. The system of claim 1, wherein
   the conduit configuration input further specifies an allowed communication path between a first zone of the security zones and a second zone of the security zones, and
   the one or more security configuration instructions set the respective asset-level security settings to further allow communication between a first subset of the industrial assets assigned to the first zone and a second subset of the industrial assets assigned to the second zone.

3. The system of claim 1, wherein the interface component is further configured to render, as the graphical interface, at least one of a table, a hierarchical configuration tree, or an interactive set of graphical icons configured to facilitate receipt of the zone configuration input and the conduit configuration input.

4. The system of claim 1, wherein
   the interface component is further configured to receive, via interaction with the graphical interface, zone security input defining one or more zone-level security properties for a security zone of the security zones, and
   the one or more security configuration instructions set the respective asset-level security settings on a subset of the industrial assets assigned to the security zone to implement the one or more zone-level security properties in accordance with the zone security input.

5. The system of claim 4, wherein the zone-level security properties comprise at least a type of security to be used for one or more of data exchange, access control, or confirmation of consistent security policy between the subset of the industrial assets assigned to the security zone.

6. The system of claim 1, wherein
   the interface component is further configured to update the security model data based on the zone configuration input, the conduit configuration input, and information identifying the industrial assets.

7. The system of claim 1, wherein the instruction translation component is further configured to generate a notification in response to identifying that at least one of the zone configuration input or the conduit configuration input specifies a security policy that is one or more of not enforceable, inappropriately permissive, or a violation of one or more defined business rules.

8. The system of claim 1, wherein the communication component is further configured to
   monitor security settings configured on the respective industrial assets, and
   in response to detection of a modification to a security setting on one of the industrial assets that violates a security policy defined by the zone configuration input and the conduit configuration input, overriding the modification to the security setting.

9. A method for configuring industrial network security, comprising:
   rendering, by a system comprising a processor, a graphical interface configured to receive security configuration data;
   receiving, by the system via interaction with the graphical interface, zone configuration input data that defines groups of industrial devices and assigns the groups to respective security zones;
   receiving, by the system via interaction with the graphical interface, conduit configuration input data that identifies a first industrial device of the industrial devices and a second industrial device of the industrial devices that are to be permitted to exchange data, wherein the first industrial device and the second industrial device are assigned to different zones of the security zones;

referencing, by the system, security model data that defines vendor and model information for the industrial devices;

generating, by the system based on a result of the referencing, one or more security configuration instructions based on the zone configuration input data and the conduit configuration input data, wherein the one or more security configuration instructions are configured to set respective device-level security settings on one or more of the industrial devices to allow communication between a subset of the industrial devices assigned to a same zone of the security zones in accordance with the zone configuration input data, and to allow communication between the first industrial device and the second industrial device in accordance with the conduit configuration input data; and sending, by the system, the one or more security instructions to the one or more of the industrial devices.

10. The method of claim 9, wherein the receiving the conduit configuration input data comprises receiving the conduit configuration input data that further identifies a first zone of the security zones and a second zone of the security zones that are to be permitted to exchange data, and the generating comprises generating the one or more security instructions to set the respective asset-level security settings to allow communication between a first subset of the industrial devices assigned to the first zone and a second subset of the industrial devices assigned to the second zone in accordance with the conduit configuration input data.

11. The method of claim 9 wherein the receiving the zone configuration input data and the receiving the conduit configuration input data comprises receiving the zone configuration input data and the conduit configuration input data via interaction with at least one of a table, a hierarchical configuration tree, or an interactive set of graphical icons rendered as part of the graphical interface.

12. The method of claim 9, further comprising receiving, by the system, zone security input data defining one or more zone-level security properties for a security zone of the security zones, wherein the generating comprises generating the one or more security instructions to set the respective asset-level security settings on a subset of the industrial devices assigned to the security zone to implement the one or more zone-level security properties based on the zone security input data.

13. The method of claim 12, wherein the receiving the zone security input data comprises receiving data defining, as the one or more zone-level security properties, at least a type of security to be used for one or more of data exchange, access control, or confirmation of consistent security policy between a subset of the industrial devices assigned to one of the security zones.

14. The method of claim 9, further comprising updating, by the system, the security model data based on the zone configuration input data, the conduit configuration input data, and information identifying the industrial devices.

15. The method of claim 9, further comprising generating, by the system, notification data in response to identifying that at least one of the zone configuration input data or the conduit configuration input data specifies a security policy that is one or more of not enforceable, inappropriately permissive, or a violation of one or more defined business rules.

16. The method of claim 9, further comprising:
monitoring, by the system, security configuration settings on the respective industrial devices, and performing, by the system, an action in response to detection of a modification to a security configuration setting on one of the industrial devices that violates a security policy defined by the zone configuration input data and the conduit configuration input data, wherein the action comprises at least one of generating a notification directed to a client device or overriding the modification.

17. A non-transitory computer-readable medium having stored thereon executable instructions that, in response to execution, cause a computer system comprising at least one processor to perform operations, the operations comprising:

displaying a graphical interface configured to receive security policy data;

receiving, via first interaction with the graphical interface, zone configuration data that defines an assignment of sets of industrial assets to respective security zones;

receiving, via second interaction with the graphical interface, conduit configuration data that specifies a first industrial asset of the sets of industrial assets and a second industrial asset of the sets of industrial assets that are permitted to communicate with each other, wherein the first industrial asset and the second industrial asset are assigned to different security zones of the security zones;

referencing security model data that defines vendor and model information for industrial devices of the sets of industrial devices;

generating, based on a result of the referencing, one or more security configuration instructions based on the zone configuration data and the conduit configuration data, wherein the one or more security configuration instructions are configured to set respective asset-level security settings on one or more of the sets of industrial assets; and sending the one or more security configuration instructions to the one or more of the industrial as sets, wherein execution of the one or more security configuration instructions on the one or more industrial assets sets the respective asset-level security settings to allow communication between assets of one of the sets of industrial assets assigned to a common security zone of the security zones in accordance with the zone configuration data, and to allow communication between the first industrial asset and the second industrial asset in accordance with the conduit configuration data.

18. The non-transitory computer-readable medium of claim 17, wherein
the conduit configuration data further specifies a first zone of the security zones and a second zone of the security zones that are permitted to communicate with each other, and the executing of the one or more security configuration instructions sets the respective asset-level security settings to allow communication between a first set of the industrial assets assigned to the first zone and a second set of the industrial assets assigned to the second zone.

19. The non-transitory computer-readable medium of claim 17, wherein the displaying comprises displaying an interactive graphic comprising at least one of a table, a hierarchical configuration tree, or an interactive set of graphical icons, and the receiving the zone configuration data and the receiving the conduit configuration data comprises receiving the zone configuration data and the conduit configuration input data via interaction with the interactive graphic.

20. The non-transitory computer-readable medium of claim 18, further comprising receiving zone security data defining one or more zone-level security properties for at least one of the security zones, wherein the generating comprises generating the one or more security configuration instructions further based on the zone security data.

* * * * *